(12) United States Patent
Meredith et al.

(10) Patent No.: US 10,834,092 B2
(45) Date of Patent: *Nov. 10, 2020

(54) ENABLING ACCESS TO RESTRICTED DATA USING GEOFENCES

(71) Applicant: AT&T Intellectual Property I, L.P., Atlanta, GA (US)

(72) Inventors: Sheldon Meredith, Roswell, GA (US); William Cottrill, Canton, GA (US); Charles Michaelis, Johns Creek, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/257,381

(22) Filed: Jan. 25, 2019

(65) Prior Publication Data

US 2019/0158508 A1   May 23, 2019

Related U.S. Application Data

(63) Continuation of application No. 15/433,411, filed on Feb. 15, 2017, now Pat. No. 10,193,894.

(51) Int. Cl.
*H04L 29/06* (2006.01)
*H04L 12/24* (2006.01)
(Continued)

(52) U.S. Cl.
CPC ............ *H04L 63/107* (2013.01); *G06F 21/62* (2013.01); *H04L 41/28* (2013.01); *H04L 63/10* (2013.01);
(Continued)

(58) Field of Classification Search
CPC ....... H04L 63/107; H04L 63/10; H04L 41/28; H04L 63/102; G06F 21/31; G06F 21/44;
(Continued)

(56) References Cited

U.S. PATENT DOCUMENTS

| 8,018,329 B2 | 9/2011 | Morgan et al. |
| 8,812,024 B2 | 8/2014 | Obermeyer et al. |

(Continued)

OTHER PUBLICATIONS

Cardone et al., "Crowdsensing in Urban Areas for City-Scale Mass Gathering Management: Geofencing and Activity Recognition," IEEE Sensors Journal, Dec. 2014, vol. 14, No. 12, pp. 4185-4195.
(Continued)

*Primary Examiner* — Ayoub Alata
(74) *Attorney, Agent, or Firm* — Hartman & Citrin LLC

(57) ABSTRACT

Concepts and technologies are disclosed herein for enabling access to restricted data using geofences. A system can identify a device associated with restricted data that includes network data that law prohibits the use of for commercial purposes without authorization. The system can determine use parameters associated with the device, each of the use parameters including a device identifier, a geofence, time limits, and an indication of purposes. The system can determine if the device is at a geographic location that satisfies the location that is defined by the geofence, if the time limits associated with the geofence are satisfied, and if a purpose for which the restricted data will be used matches a one of the purposes. If the system determines that the location, time limits, and purposes are satisfied, the system can use the restricted data for the purpose.

20 Claims, 11 Drawing Sheets

US 10,834,092 B2
Page 2

(51) Int. Cl.
| | |
|---|---|
| *H04W 12/08* | (2009.01) |
| *G06F 21/62* | (2013.01) |
| *G06F 21/31* | (2013.01) |
| *G06F 21/44* | (2013.01) |
| *G06F 21/00* | (2013.01) |
| *G06F 21/30* | (2013.01) |
| *H04W 12/00* | (2009.01) |

(52) U.S. Cl.
CPC ............. *H04W 12/08* (2013.01); *G06F 21/00* (2013.01); *G06F 21/30* (2013.01); *G06F 21/31* (2013.01); *G06F 21/44* (2013.01); *G06F 2221/2111* (2013.01); *G06F 2221/2137* (2013.01); *H04L 63/102* (2013.01); *H04W 12/00502* (2019.01); *H04W 12/00503* (2019.01); *H04W 12/00512* (2019.01)

(58) Field of Classification Search
CPC .......... G06F 21/00; G06F 21/30; G06F 21/62; G06F 2221/2111; G06F 2221/2137; H04W 12/08; H04W 12/00503; H04W 12/00512; H04W 12/00502
See application file for complete search history.

(56) References Cited

U.S. PATENT DOCUMENTS

| | | | |
|---|---|---|---|
| 8,941,489 B2 | 1/2015 | Sheshadri et al. | |
| 8,971,930 B2 | 3/2015 | Li et al. | |
| 9,043,222 B1 | 5/2015 | Kerr et al. | |
| 9,116,818 B2 | 8/2015 | Bilange et al. | |
| 9,307,361 B2 | 4/2016 | Ziskind et al. | |
| 9,311,685 B2 | 4/2016 | Harkey et al. | |
| 9,398,409 B2 | 7/2016 | Porter | |
| 2015/0170141 A1* | 6/2015 | Klingen | G06Q 20/027 705/41 |
| 2015/0348214 A1 | 12/2015 | Jain | |
| 2016/0048857 A1 | 2/2016 | Jain et al. | |
| 2016/0073261 A1 | 3/2016 | Hughes, Jr. et al. | |
| 2016/0169696 A1 | 6/2016 | Butts, III et al. | |
| 2016/0182404 A1* | 6/2016 | Rastogi | H04L 47/829 709/225 |

OTHER PUBLICATIONS

Namiot et al., "Geofence and Network Proximity," Internet of Things, Smart Spaces, and Next Generation Networking, Proceedings of the 13th International Conference, NEW2AN 2013 and 6th Conference, ruSMART 2013, Aug. 28-30, 2013, pp. 117-127.

U.S. Office Action dated Apr. 13, 2018 in U.S. Appl. No. 15/433,411.
U.S. Notice of Allowance dated Sep. 6, 2018 in U.S. Appl. No. 15/433,411.

\* cited by examiner

ENABLING ACCESS TO RESTRICTED DATA USING GEOFENCES

CROSS-REFERENCE TO RELATED APPLICATIONS

This application is a continuation of and claims priority to U.S. patent application Ser. No. 15/433,411, entitled "Enabling Access to Restricted Data Using Geofences," filed Feb. 15, 2017, now U.S. Pat. No. 10,193,894 which is incorporated herein by reference in its entirety.

BACKGROUND

Network operators (e.g., operators associated with various networks such as communications networks) can have access to enormous amounts of user data by virtue of owning and/or operating the associated networks. For example, a carrier may have access to user data that can define movements of the user, usage of the user over time (sites visited, locations visited, searches, purchase history, etc.), or other data. Because of the private (or semi-private) nature of some user data, various governmental entities may restrict use of the user data to strictly non-commercial uses.

Thus, carriers may be allowed to access the user data for purposes of, for example, predicting future demand of network resources based on traffic in a particular location over time. The carriers, however, are not authorized to use the information associated with a particular user for any commercial purpose and/or to monetize that information in any way. Thus, a wealth of data must be kept confidential, notwithstanding the possible benefits that may accrue not only to network operators, but also users on the networks, through limited disclosure.

SUMMARY

The present disclosure is directed to enabling access to restricted data using geofences. As used herein, the phrase "restricted data" is used to refer to data that networks have access to (as part of operations), where law and/or regulation prohibit the use of the data for commercial purposes (e.g., network data (e.g., data obtained from network elements) that law and/or regulation ("law") prohibits the use of for any commercial purposes without authorization from a user associated with the network data (e.g., a user whose device is associated with the network data)). Thus, "restricted data" as used herein does not include account information or the like, but rather operational information or data that network operators may have access to by virtue of owning or operating a network. According to various embodiments of the concepts and technologies disclosed herein, a restricted data access service can be operated on a device such as a server computer. The restricted data access service can obtain restricted data from one or more network elements and can store the restricted data at a data storage location (e.g., a data store).

The restricted data access service can identify a device associated with the restricted data (e.g., identify data associated with the device in the restricted data) and can determine if the device identified has opted-in to enabling access to restricted data associated with the device. If the device has opted-in to enabling access to the restricted data associated with the device, the restricted data access service can access the restricted data (or receive restricted data) and use the restricted data for a purpose as authorized by the device if location and time parameters are also satisfied. The restricted data access service can access one or more use parameters, where each of the user parameters can define at least an identifier that identifies a device, a geofence that defines location limits, time limits associated with the device and location limits, and a purpose associated with the device, location limits, and time limits. Thus, a use parameter can define a purpose, time, and location for and at which restricted data associated with a particular device can be used.

The restricted data access service also can be configured to obtain the use parameters from devices. A device can obtain an opt-in decision from a user or other entity associated with the device. The opt-in decision can include the parameters (e.g., locations, times, and purposes). The restricted data access service can store the parameters as the use parameters. During analysis of the restricted data, the restricted data access application can be configured to obtain contextual information from a user associated with the restricted data. In some embodiments, the restricted data access service can interrogate the device for contextual information, though this is not necessarily the case. These and other aspects of the concepts and technologies disclosed herein will be illustrated and described in more detail below.

According to one aspect of the concepts and technologies disclosed herein, a system is disclosed. The system can include a processor and a memory. The memory can store computer-executable instructions that, when executed by the processor, cause the processor to perform operations. The operations can include identifying a device associated with restricted data. The restricted data can include network data that law prohibits the use of for commercial purposes without authorization. The operations further can include determining use parameters associated with the device. Each of the use parameters can include a device identifier associated with the device, a geofence that defines a location at which the use is authorized, time limits associated with the geofence, and purposes for which the use is authorized. The operations further can include determining if the device is at a geographic location that satisfies the location that is defined by the geofence; determining if the time limits associated with the geofence are satisfied; determining a purpose for which the restricted data will be used; and if a determination is made that the location that is defined by the geofence is satisfied, that the time limits are satisfied, and that the purpose matches one of the purposes, using the restricted data for the purpose.

In some embodiments, the computer-executable instructions, when executed by the processor, cause the processor to perform operations further including generating the use parameters. In some embodiments, generating the use parameters can include sending, to the device, an opt-in request; receiving, in response to the opt-in request, device data that can include an opt-in decision, the opt-in decision including location parameters, time parameters, and purpose parameters; and storing the use parameters, the use parameters include the device data. In some embodiments, the computer-executable instructions, when executed by the processor, cause the processor to perform operations further including obtaining context data from the device. Using the restricted data for the purpose can include using the restricted data and the context data for the purpose.

In some embodiments, obtaining the context data can include sending, to the device, a data interrogation that specifies contextual information requested from the device; and receiving, from the device, the context data including the contextual information requested. In some embodiments, the computer-executable instructions, when executed by the processor, cause the processor to perform operations further including if a determination is made that the location that is defined by the geofence is not satisfied, disallowing use of the restricted data for the purpose. In some embodiments, the computer-executable instructions, when executed by the processor, cause the processor to perform operations further including if a determination is made that the time limits are not satisfied, disallowing use of the restricted data for the purpose. In some embodiments, the computer-executable instructions, when executed by the processor, cause the processor to perform operations further including if a determination is made that the purpose does not match one of the purposes, disallowing use of the restricted data for the purpose.

According to another aspect, a method is disclosed. The method can include identifying, at a system that can include a processor, a device associated with restricted data. The restricted data can include network data that law prohibits the use of for commercial purposes without authorization. The method also can include determining, by the processor, use parameters associated with the device. Each of the use parameters can include a device identifier associated with the device; a geofence that defines a location at which the use is authorized; time limits associated with the geofence; and purposes for which the use is authorized. The method also can include determining, by the processor, if the device is at a geographic location that satisfies the location that is defined by the geofence; determining, by the processor, if the time limits associated with the geofence are satisfied; determining, by the processor, a purpose for which the restricted data will be used; and if a determination is made that the location that is defined by the geofence is satisfied, that the time limits are satisfied, and that the purpose matches one of the purposes, using, by the processor, the restricted data for the purpose.

In some embodiments, the method also can include generating the use parameter. Generating the use parameters can include sending, to the device, an opt-in request; receiving, in response to the opt-in request, device data that can include an opt-in decision, the opt-in decision including location parameters, time parameters, and purpose parameters; and storing the use parameters, the use parameters include the device data. In some embodiments, the method also can include obtaining context data from the device. Using the restricted data for the purpose can include using the restricted data and the context data for the purpose.

In some embodiments, obtaining the context data can include sending, to the device, a data interrogation that specifies contextual information requested from the device; and receiving, from the device, the context data including the contextual information requested. In some embodiments, the method also can include if a determination is made that the location that is defined by the geofence is not satisfied, disallowing use of the restricted data for the purpose. In some embodiments, the method also can include if a determination is made that the time limits are not satisfied, disallowing use of the restricted data for the purpose. In some embodiments, the method also can include if a determination is made that the purpose does not match one of the purposes, disallowing use of the restricted data for the purpose.

According to yet another aspect of the concepts and technologies disclosed herein, a computer storage medium is disclosed. The computer storage medium can store computer-executable instructions that, when executed by a processor, cause the processor to perform operations. The operations can include identifying a device associated with restricted data. The restricted data can include network data that law prohibits the use of for commercial purposes without authorization. The operations further can include determining use parameters associated with the device. Each of the use parameters can include a device identifier associated with the device, a geofence that defines a location at which the use is authorized, time limits associated with the geofence, and purposes for which the use is authorized. The operations further can include determining if the device is at a geographic location that satisfies the location that is defined by the geofence; determining if the time limits associated with the geofence are satisfied; determining a purpose for which the restricted data will be used; and if a determination is made that the location that is defined by the geofence is satisfied, that the time limits are satisfied, and that the purpose matches one of the purposes, using the restricted data for the purpose.

In some embodiments, the computer-executable instructions, when executed by the processor, cause the processor to perform operations further including generating the use parameters. Generating the use parameters can include sending, to the device, an opt-in request; receiving, in response to the opt-in request, device data that can include an opt-in decision, the opt-in decision including location parameters, time parameters, and purpose parameters; and storing the use parameters, the use parameters include the device data. In some embodiments, the computer-executable instructions, when executed by the processor, cause the processor to perform operations further including obtaining context data from the device. Using the restricted data for the purpose can include using the restricted data and the context data for the purpose.

In some embodiments, the computer-executable instructions, when executed by the processor, cause the processor to perform operations further including if a determination is made that the location that is defined by the geofence is not satisfied, disallowing use of the restricted data for the purpose. In some embodiments, the computer-executable instructions, when executed by the processor, cause the processor to perform operations further including if a determination is made that the purpose does not match one of the purposes, disallowing use of the restricted data for the purpose.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
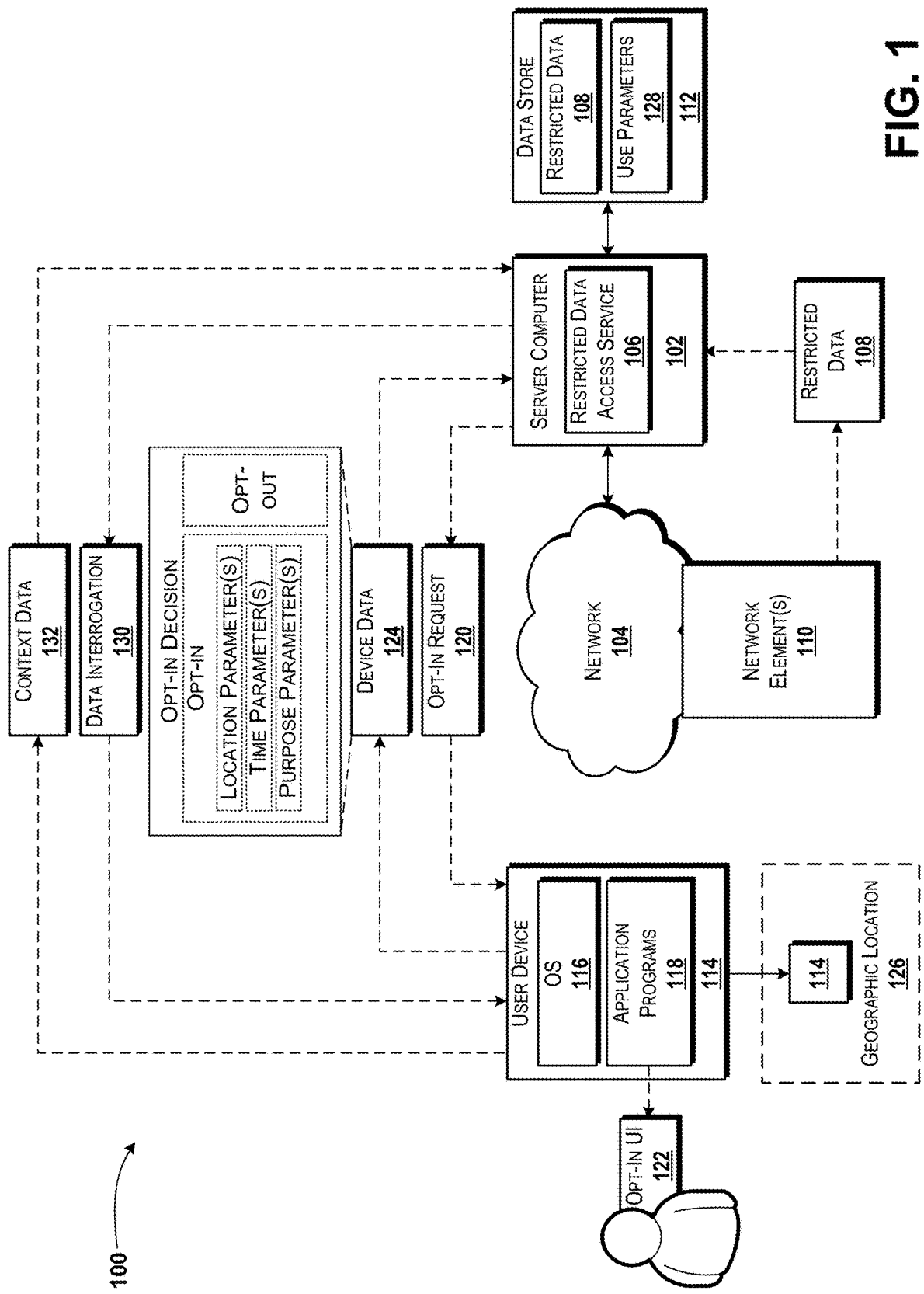
FIG. 1 is a system diagram illustrating an illustrative operating environment for various embodiments of the concepts and technologies described herein.

The following detailed description is directed to enabling access to restricted data using geofences. A restricted data access service can obtain restricted data from one or more network elements. The restricted data access service can store the restricted data at a data storage location (e.g., a data store). The restricted data access service can identify a device associated with the restricted data (e.g., identify data associated with the device in the restricted data) and can determine if the device identified has opted-in to enabling access to restricted data associated with the device. If the device has opted-in to enabling access to the restricted data associated with the device, the restricted data access service can access the restricted data (or receive restricted data) and use the restricted data for a purpose as authorized by the device if location and time parameters are also satisfied. The restricted data access service can access one or more use parameters, where each of the user parameters can define at least an identifier that identifies a device, a geofence that defines location limits, time limits associated with the device and location limits, and a purpose associated with the device, location limits, and time limits. Thus, a use parameter can define a purpose, time, and location for and at which restricted data associated with a particular device can be used.

The restricted data access service also can be configured to obtain the use parameters from devices. A device can obtain an opt-in decision from a user or other entity associated with the device. The opt-in decision can include the parameters (e.g., locations, times, and purposes). The restricted data access service can store the parameters as the use parameters. During analysis of the restricted data, the restricted data access application can be configured to obtain contextual information from a user associated with the restricted data. In some embodiments, the restricted data access service can interrogate the device for contextual information, though this is not necessarily the case. These and other aspects of the concepts and technologies disclosed herein will be illustrated and described in more detail below.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for enabling access to restricted data using geofences will be described, according to an illustrative embodiment. The operating environment 100 shown in FIG. 1 is illustrated as including a server computer 102. The server computer 102 can operate in communication with and/or as part of a communications network ("network") 104. Additional details of the network 104 are illustrated and described below with reference to FIG. 4.

According to various embodiments, the functionality of the server computer 102 may be provided by one or more web servers, desktop computers, other computing systems, and the like. It should be understood that the functionality of the server computer 102 can be provided by a single device, by two similar devices, and/or by two or more dissimilar devices. For example, the functionality of the server computer 102 can be provided by multiple servers in a server farm or other cloud computing platform, if desired. For purposes of describing the concepts and technologies disclosed herein, the server computer 102 is described herein as a single device. Based on the above, however, it should be understood that the described embodiment is illustrative, and therefore should not be construed as being limiting in any way.

The server computer 102 can execute (e.g., host) a restricted data access service 106. As will be explained in more detail herein, the restricted data access service 106 can be configured to store data, to analyze data, and/or to provide other functionality as illustrated and described herein. In particular, the restricted data access service 106 can be configured to obtain, store, analyze, and/or use restricted data 108.

The restricted data 108 can be generated by and/or obtained from one or more network elements 110. The network elements 110 can collect the restricted data 108. The restricted data 108 can include various types of information relating to subscribers or other users ("users") of a network. Thus, the restricted data 108 can include, among other things, network usage statistics for one or more network, network elements, and/or users; location information for one or more users; identity information for one or more users; deep packet inspection information for one or more users, traffic, and/or data flows; private data for one or more users; usage history for one or more users; movement history for one or more users; other information that may be proprietary, private, or sensitive; combinations thereof; or the like. The restricted data 108 can be stored in a data storage device such as a database, a memory, or other data store ("data store") 112. The functionality of the data store 112 can be provided by one or more databases, server computers, desktop computers, mobile telephones, laptop computers, other computing systems, combinations thereof, or the like. In the illustrated embodiments, the functionality of the data store 112 is provided by a database hosted by a server computer. It should be understood that this example is illustrative, and therefore should not be construed as being limiting in any way.

According to various embodiments of the concepts and technologies disclosed herein, the restricted data 108 can correspond to various types of information that may be collected and/or used by network carriers for limited reasons under existing law, rules, and/or regulations that may apply to various government agencies such as the Federal Communications Commission ("FCC"), the Federal Trade Commission ("FTC"), and/or other regulatory and/or governmental authorities. Thus, the restricted data 108 can correspond to data that is usable by carriers or other entities (e.g., an entity that owns or operates a portion of the network 104 shown in FIG. 1) for limited purposes. According to various embodiments, the restricted data 108 is not usable by carriers or other entities for any commercial purpose without consent from the users to whom the restricted data 108 relates.

For these and other reasons, the concepts and technologies disclosed herein can be used to enable access to and/or use of the restricted data 108 for some commercial purposes, while access to and/or use of restricted data 108 otherwise is prohibited by law and/or regulation. In particular, according to various embodiments of the concepts and technologies disclosed herein, the restricted data access service 106 can be configured to obtain permission from one or more users to access and/or use the restricted data 108 for some commercial purposes that can be defined by users or other entities, preferences and/or settings, or the like. The purposes can be defined not only in terms of what the restricted data 108 is used for, but also in terms of location and time; namely users or other entities can limit use of the restricted data 108 to specific locations, specific times and/or timeframes, as well as specific uses. As will be explained in more detail below, the specific purposes for which the users authorize use of the restricted data 108, times at which such use is authorized, and locations at which the user is authorized can be specified by the users or other entities when authorizing such use. These and other aspects of enabling access to restricted data 108 will be explained in more detail below.

According to various embodiments of the concepts and technologies disclosed herein, the restricted data access service 106 can identify a device such as a user device 114 that is to participate in enabling use of the restricted data 108. The user device 114 can execute an operating system and one or more application programs 118. The operating system 116 can include a computer program for controlling the operation of the user device 114, and the application programs 118 can include executable programs that can be configured to execute on top of the operating system 116 to provide various functions.

In some embodiments, the user device 114 can be identified by the restricted data access service 106 by receiving a request from the user device 114 (e.g., a request that indicates a desire to participate, or the like); a request from other entities (e.g., network operators, a web portal, or other entities); or from other entities. In some other embodiments, the restricted data access service 106 can identify the user device 114 without any request. Rather, the restricted data access service 106 can access restricted data 108, identify one or more devices associated with the restricted data 108 (e.g., devices associated with data that is included in the restricted data 108), and identify the user device 114 as one of the devices associated with the data. In yet other embodiments, the application programs 118 may generate a request or other form of communication that can be understood by the restricted data access service 106 as indicating that the user device 114 is to be interrogated regarding opting-in or opting-out of functionality associated with the restricted data access service 106 (in some cases, each device associated with a carrier network may be interrogated). Because the restricted data access service 106 can identify the user device 114 in additional and/or alternative manners, it should be understood that these examples are illustrative, and therefore should not be construed as being limiting in any way.

The restricted data access service 106 can be configured to obtain, from the user device 114, information relating to an opt-in or opt-out for the use of the restricted data 108 for commercial purposes. In some embodiments of the concepts and technologies disclosed herein, the restricted data access service 106 can trigger delivery of an opt-in request 120 to the user device 114. In some embodiments, the restricted data access service 106 can create the opt-in request 120 and the opt-in request 120 can be sent to the user device 114 by the server computer 102. In some other embodiments, the restricted data access service 106 can trigger delivery of the opt-in request 120 by other devices on or in communication with the network 104 and/or other networks. In yet other embodiments, the opt-in request 120 may not be an explicit request—rather a user or other entity may be asked to opt-in or opt-out of use of the restricted data 108 during activation of a service, purchase of a device, and/or at other times. As such, it should be understood that the opt-in request 120 may not be included as such in all embodiments. Thus, the illustrated embodiment is illustrative and should not be construed as being limiting in any way.

Regardless of how the opt-in request 120 (or an equivalent) is provided to the user device 114, the user device 114 can be configured to obtain, from a user or other entity, a decision relating the sharing of the restricted data 108. In some embodiments, the user device 114 can generate an opt-in user interface (labeled "opt-in UI" in FIG. 1) 122. The opt-in UI 122 can inform a user or other entity of the availability of the restricted data access service 106. The opt-in UI 122 also can ask the user or other entity to opt-in or opt-out of the restricted data access service 106. The opt-in UI 122 also can enable a user or other entity to define purposes, times, and locations for which the opt-in is restricted, if desired. Some example embodiments of the opt-in UI 122 are illustrated and described below with reference to FIGS. 5A-5D. Although not shown in FIG. 1, it should be understood that the application programs 118 can include a restricted data access application that can be configured to generate and/or provide the opt-in UI 122 and to provide input obtained via the opt-in UI 122 to the restricted data access service 106. The restricted data access application or other applications or modules (e.g., the application programs 118) also can be configured to create and provide context data as will be explained in more detail below.

The user device 114 can be configured to provide, to the restricted data access service 106, device data 124. The device data 124 can include data that is responsive to the opt-in request 120 (or some other equivalent as illustrated and described above). In various embodiments, the device data 124 can include an opt-in decision. The opt-in decision can include an opt-in or an opt-out. If the opt-in decision includes an opt-out, then in some embodiments, no other data may be included in the device data 124. The restricted data access service 106 can be configured to identify the user device 114 as an opt-out device or as a blacklisted device, thereby maintaining all restrictions to use of the restricted data 108. It should be understood that this example is illustrative, and therefore should not be construed as being limiting in any way.

If the device data 124 includes an opt-in, the device data 124 can include additional data that can further define the opt-in. In particular, the opt-in can include one or more location parameter(s), one or more time parameter(s), one or more purpose parameter(s), other parameters (e.g., requestors that are permitted to use the restricted data 108, frequency with which the restricted data 108 can be used, etc.), combinations thereof, or the like. The one or more location parameter(s) can define a geofence. As used herein, a "geofence" refers to a geographic area or specific geographic location.

In the case of a geographic area, the geofence can define borders associated with the geographic area. The borders can be defined as three or more coordinates that, when joined by imaginary lines, define a geographic area. Of course, the borders can have any shape and therefore can be defined by any number of coordinates (or as a center point of a geometric shape of a defined size, etc.). The user device 114 can be determined to be within the geofence (defined by borders) when the geographic location of the user device 114 is within the defined borders. Because the borders of a geofence can be created in various manners, and because the presence of the user device 114 within the borders can be determined in a number of manners, it should be understood that this example is illustrative, and therefore should not be construed as being limiting in any way.

In the case of a specific geographic location, the geofence can define a specific location and a defined threshold (e.g., ten meters, fifty meters, one mile, or the like) associated with that specific location. The user device 114 can be determined to be within the geofence when at a geographic location associated with the specified location and/or when within the defined threshold of the specific location. Thus, a user or other entity may define the geofence as a specific location (e.g., a home, office, or the like) and the threshold can be defined to cover error associated with determining location (e.g., ten to twenty meters for global positioning system ("GPS") technologies, fifty to one hundred feet for WiFi-based technologies, fifty to two hundred meters for network triangulations, or the like). Because a geofence that specifics a specific location can be created in various manners, and because the presence of the user device 114 at the specific location (or within a threshold) can be determined in a number of manners, it should be understood that this example is illustrative, and therefore should not be construed as being limiting in any way.

The one or more time parameter(s) can define one or more time(s) at which the use of the restricted data 108 associated with the user device 114 is to be enabled. The time parameters can be required in addition to the location parameters in various embodiments. Thus, if the user device 114 is not inside or at a defined geofence, the restricted data access service 106 may not access the restricted data 108 associated with the user device 114 for commercial purposes. If the user device 114 is inside or at a defined geofence, the restricted data access service 106 may access the restricted data 108 associated with the user device 114 for commercial purposes only if the time parameters (and the purpose parameters) are also met. The time parameters can be defined in various manners.

In some embodiments, the time parameters can be defined as days and times (e.g., Monday from 2:00 PM to 3:00 PM; Tuesday from 9:00 AM to 11:00 AM, or the like); as times (e.g., every day from 6:34 AM to 10:27 AM); as days (e.g., every Monday, every other Wednesday, the fifteenth of the month, etc.); and/or the like. The time parameters can be defined in almost any manner and granularity (seconds, minutes, hours, days, weeks, months, years, etc.). Thus, the above examples are illustrative and should not be construed as being limiting in any way.

The one or more purpose parameter(s) can define one or more purpose(s) for which the use of the restricted data 108 associated with the user device 114 is to be enabled. The purpose parameters can be required in addition to the location parameters and the time parameters in various embodiments. Thus, if the user device 114 is not inside or at a defined geofence and within a defined time or timeframe, the restricted data access service 106 may not access the restricted data 108 associated with the user device 114 for commercial purposes. If the user device 114 is inside or at a defined geofence and if the time matches one or more defined time parameters, the restricted data access service 106 may access the restricted data 108 associated with the user device 114 for commercial purposes only if the purpose parameters are also met. The purpose parameters can be defined in various manners.

In various embodiments, the purpose parameters can be define in terms of resources used (e.g., location services, data services, voice services, or the like); types of applications (e.g., service-based applications initiated at the user device 114, service-based applications/services initiated remote from the user device 114, etc.); identity of a requestor (e.g., the user device 114, a network entity, etc.); types of information used (e.g., movement history of the user device 114, purchase history associated with the user device 114, contact lists associated with the user device 114, etc.); types of services for which the restricted data 108 is being accessed (e.g., advertising, sales, etc.); combinations thereof; or the like. According to various embodiments of the concepts and technologies disclosed herein, a user or other entity can define purposes in terms of categories or types of purposes; in terms of device sensors used or accessed; in terms of data (or data types) accessed; combinations thereof; or the like. Some example user interfaces for obtaining the location parameters, time parameters, and purpose parameters are illustrated and described herein with reference to FIGS. 5A-5D.

The restricted data access service 106 can receive or otherwise obtain the device data 124. The restricted data access service 106 can analyze the device data 124 and determine, for the user device 114, the opt-in decision associated with the user device 114. In the event of an opt-out, the restricted data access service 106 can store data that indicates that the user device 114 does not allow access to the restricted data 108 for commercial purposes. In some embodiments, the user device 114 can be added to a "blacklist" or the like, thereby avoiding use of the restricted data 108 associated with the user device 114 for any commercial purposes. It should be understood that this example is illustrative, and therefore should not be construed as being limiting in any way.

In the event of an opt-in, the restricted data access service 106 can be configured to capture the various parameters associated with the device data 124 and store, in the data store 112, use parameters 128. The use parameters 128 can define, for one or more devices including the user device 114, times, locations, and purposes at which restricted data 108 associated with the user device 114 can be used. It can be appreciated that in the case of an opt-out, the use parameters 128 can indicate the opt-out and/or can indicate no time, no purpose, or no locations. Furthermore, it should be understood that the location parameters can be stored in sets of coordinates that identify the geofences illustrated and described herein. Thus, each record in the use parameters 128 can include at least four pieces of data, in various embodiments, namely 1) a device identifier; 2) a time parameter; 3) a purpose parameter; and a 4) geofence. As noted above, the geofence can be defined as either a 1) location and associated threshold; or 2) a set of coordinates that define borders for the geofence. It should be understood that this example is illustrative, and therefore should not be construed as being limiting in any way.

When the restricted data access service 106 detects receipt of a next batch or instance of restricted data 108, the restricted data access service 106 can be configured to apply the use parameters 128. In particular, the restricted data access service 106 can analyze the restricted data 108 to identify a device associated with the restricted data 108. Upon identifying the device, the restricted data access service 106 can access the use parameters 128 to determine if any use of the restricted data 108 can be made. The restricted data access service 106 can query the use parameters 128 and identify all records associated with the device (e.g., all records that have a device identifier that matches the device). The restricted data access service 106 can analyze all identified records and determine time(s), location(s), and purpose(s) associated with each of the records.

The restricted data access service 106 can determine a current geographic location (labeled "geographic location 126" in FIG. 1) at which the device is located; determine a current time; and determine a purpose for which the restricted data 108 is to be used. If the current location of the device matches a location defined by any the records; and if a current time matches a time defined by any of the records; and if a purpose matches a purpose of any of the records, the restricted data access service 106 can authorize use of the restricted data 108 for the purpose(s) specified by the one or more matching records. If there is match with a time, location, and purpose of any record, then the restricted data access service 106 can maintain existing prohibitions on use of the restricted data 108. It should be understood that this example is illustrative, and therefore should not be construed as being limiting in any way.

In some embodiments, the restricted data access service 106 can also be configured to interrogate a device (e.g., the user device 114) for additional data as part of analyzing or using the restricted data 108. Thus, in some embodiments, when the restricted data access service 106 determines that a use of the restricted data 108 is authorized, the restricted data access service 106 can interrogate the user device 114 for additional information. For example, the restricted data access service 106 can generate a data interrogation 130. The data interrogation 130 can correspond to a request for context data 132 or other information associated with the user device 114. The context data 132 can define, for example, a process being completed at the user device 114 at a current time (or within a threshold amount of time such as one minute, five minutes, 15 minutes, one hour, etc.); a location to which the user device 114 is being transported; or the like. Thus, the context data 132 can provide context for the restricted data 108. It can be appreciated that the data interrogation 130 can specify what type of context data 132 is being requested, in some embodiments.

The restricted data access service 106 can be configured to analyze the restricted data 108 and the context data 132 (if obtained) for commercial purposes. Thus, embodiments of the concepts and technologies disclosed herein can enable use of restricted data 108 for commercial purposes without violating law and/or regulations that govern such use, all based on an opt-in and/or parameters defined by an opt-in. It should be understood that this example is illustrative, and therefore should not be construed as being limiting in any way.

FIG. 1 illustrates one server computer 102, one network 104, one instance of network element(s) 110, one data store 112, and one user device 114. It should be understood, however, that various implementations of the operating environment 100 can include zero, one, or more than one server computer 102; zero, one, or more than one network 104; zero, one, or more than one instance of network element(s) 110; zero, one, or more than one data store 112; and/or zero, one, or more than one user device 114. As such, the illustrated embodiment should be understood as being illustrative, and should not be construed as being limiting in any way.

Figure 2:
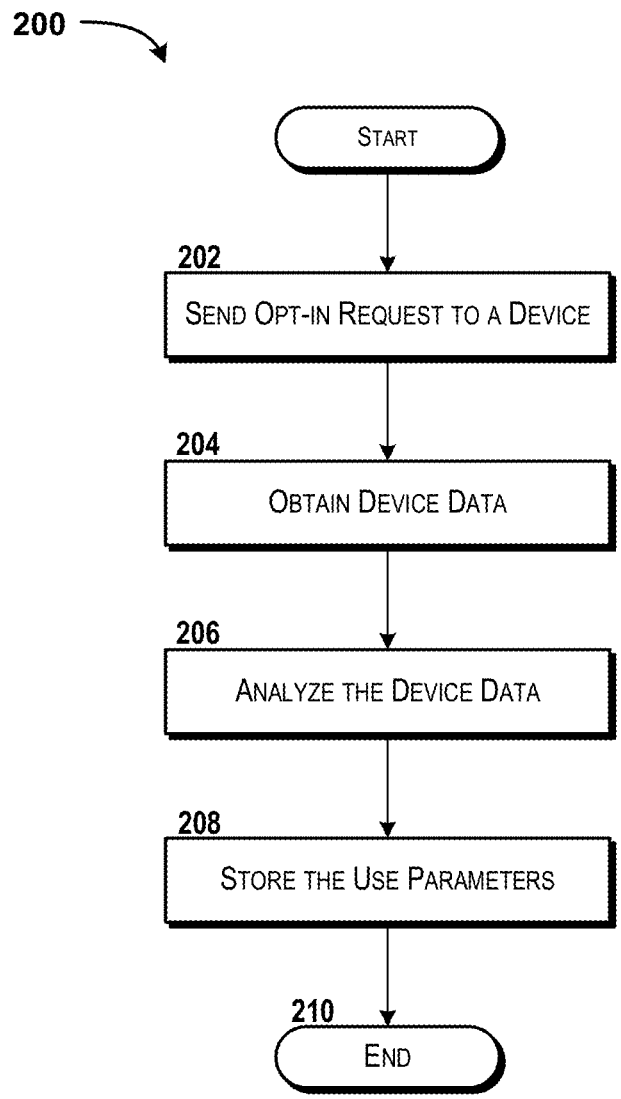
FIG. 2 is a flow diagram showing aspects of a method for providing an opt-in process to enable access to restricted data, according to an illustrative embodiment of the concepts and technologies described herein.

Turning now to FIG. 2, aspects of a method 200 for providing an opt-in process to enable access to restricted data will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 102 or the user device 114, to perform one or more operations and/or causing the processor to direct other components of the computing system or device to perform one or more of the operations.

For purposes of illustrating and describing the concepts of the present disclosure, the method 200 is described herein as being performed by the server computer 102 via execution of one or more software modules such as, for example, the restricted data access service 106. It should be understood that additional and/or alternative devices and/or network nodes can provide the functionality described herein via execution of one or more modules, applications, and/or other software including, but not limited to, the restricted data access service 106. Thus, the illustrated embodiments are illustrative, and should not be viewed as being limiting in any way.

The method 200 begins at operation 202. At operation 202, the server computer 102 can send an opt-in request to a device. For example, the server computer 102 can send an opt-in request such as the opt-in request 120 illustrated and described in FIG. 1 to a device such as the user device 114. For purposes of clarity, this example will be described. The opt-in request 120 sent in operation 202 can be configured to inform a user or other entity associated with the user device 114 that restricted data 108 associated with the user device 114 can be used for commercial purposes. In some embodiments, the opt-in request 120 can inform the user or other entity that the restricted data 108 can be used for commercial purposes only if the user or other entity authorizes such use.

The opt-in request 120 also can be configured to inform the user or other entity that he or she can define geofences that define or identify locations in or at which the user or other entity authorizes use of the restricted data 108 associated with the user device 114. The opt-in request 120 also can be configured to inform the user or other entity that he or she can define times at which the user or other entity authorizes use of the restricted data 108 associated with the user device 114. The opt-in request 120 also can be configured to inform the user or other entity that he or she can define purposes for which the user or other entity authorizes use of the restricted data 108 associated with the user device 114. Because the opt-in request 120 can include additional information, it should be understood that this example is illustrative, and therefore should not be construed as being limiting in any way.

The server computer 102 can send, provide, or trigger other devices to send or provide the opt-in request 120 to the user device 114. In some embodiments, the server computer 102 can send the opt-in request 120 to the user device 114. In some other embodiments, the server computer 102 can instruct other devices or entities to send or otherwise provide the opt-in request 120 the user device 114. Thus, it should be understood that operation 202 can include the server computer 102 sending or providing the opt-in request 120 to the user device 114, or triggering delivery of the opt-in request 120 to the user device 114. Also, as explained above with reference to FIG. 1, the opt-in request 120 can be "provided" to the user device 114 by other entities (e.g., by a web portal during ordering of a service, purchase of a device, activation of a service, etc.). Thus, the illustrated embodiment is illustrative and should not be construed as being limiting in any way.

From operation 202, the method 200 can proceed to operation 204. At operation 204, the server computer 102 can obtain device data 124. As explained above with reference to FIG. 1, the device data 124 can include, among other things, a response to the opt-in request 120 (or equivalent). Thus, the device data 124 can include, for example, an opt-in decision such as an opt-out or an opt-in, where the opt-in decision can indicate a desire, preference, or setting associated with the user device 114 relating to whether or not restricted data 108 associated with the user device 114 may be used for commercial purposes by the restricted data access service 106. As explained above and shown in FIG. 1, an opt-out can indicate that the restricted data 108 associated with the user device 114 cannot be used for any purpose other than those permitted by law and/or regulation, while an opt-in can include or define location parameters, time parameters, purpose parameters, and/or other parameters that define when, where, and why the restricted data 108 associated with the user device 114 can be used for commercial purposes.

From operation 204, the method 200 can proceed to operation 206. At operation 206, the server computer 102 can analyze the device data 124 obtained in operation 204. The server computer 102 can analyze the device data 124 to determine where the restricted data 108 associated with the user device 114 can be used for commercial purposes or not (an opt-in or an opt-out, respectively). In the case of an opt-in, the server computer 102 can analyze the device data 124 to further determine the various parameters defined for use of the restricted data 108 associated with the user device 114. Thus, the server computer 102 can identify, in operation 206, location parameters, time parameters, and purpose parameters associated with the user device 114. The server computer 102 also can identify, in some embodiments, other parameters in addition to the location parameters, time parameters, and purpose parameters, such as, for example, frequency parameters, requestor parameters, and the like.

In some embodiments, the device data 124 can be configured by the user device 114 (e.g., by execution of a restricted data access application) such that the restricted data access service 106 can identify the parameters. In some other embodiments, the restricted data access service 106 can be configured to analyze the device data 124 and identify the parameters based on the analysis. Regardless of how the parameters are identified by the server computer 102, operation 206 can include the analysis of the device data 124 and identification of the parameters.

From operation 206, the method 200 can proceed to operation 208. At operation 208, the server computer 102 can store use parameters such as the use parameters 128 illustrated and described with reference to FIG. 1. As explained above, the use parameters 128 can include at least four pieces of data, namely 1) a device identifier that identifies the user device 114 (or a user, account, or other entity associated with the user device 114); 2) a geofence that defines location(s) at which restricted data 108 associated with the user device 114 can be used for commercial purposes; 3) time information that defines times, time ranges, timeframes, etc. at which restricted data 108 associated with the user device 114 can be used for commercial purposes; and 4) purpose information that defines purposes (s) for which restricted data 108 associated with the user device 114 can be used for commercial purposes. As noted above, various embodiments of the concepts and technologies disclosed herein can request that any use of the restricted data 108 associated with a user device 114 must satisfy all four pieces of data in a particular record, namely, the device, the geofence, the time, and the purpose.

It therefore can be appreciated that the method 200 can be performed by the server computer 102 to create the use parameters 128 illustrated and described herein. The use parameters 128 can correspond to records that are considered to determine if restricted data 108 can be used for commercial purposes. The use parameters 128 identify devices, locations, times, and purposes for which the restricted data 108 can be used. In some embodiments, the use parameters 128 can be supplemented with other parameters such as frequency parameters (e.g., parameters that can define how many times restricted data 108 can be used in a particular time or time frame, when located at a particular location, for a particular purpose, or the like), requestor parameters (e.g., parameters that can define how many requests from a particular requestor will be considered, what requestors can or cannot obtain access, etc.), other parameters, or the like.

From operation 208, the method 200 can proceed to operation 210. The method 200 can end at operation 210.

Figure 3:
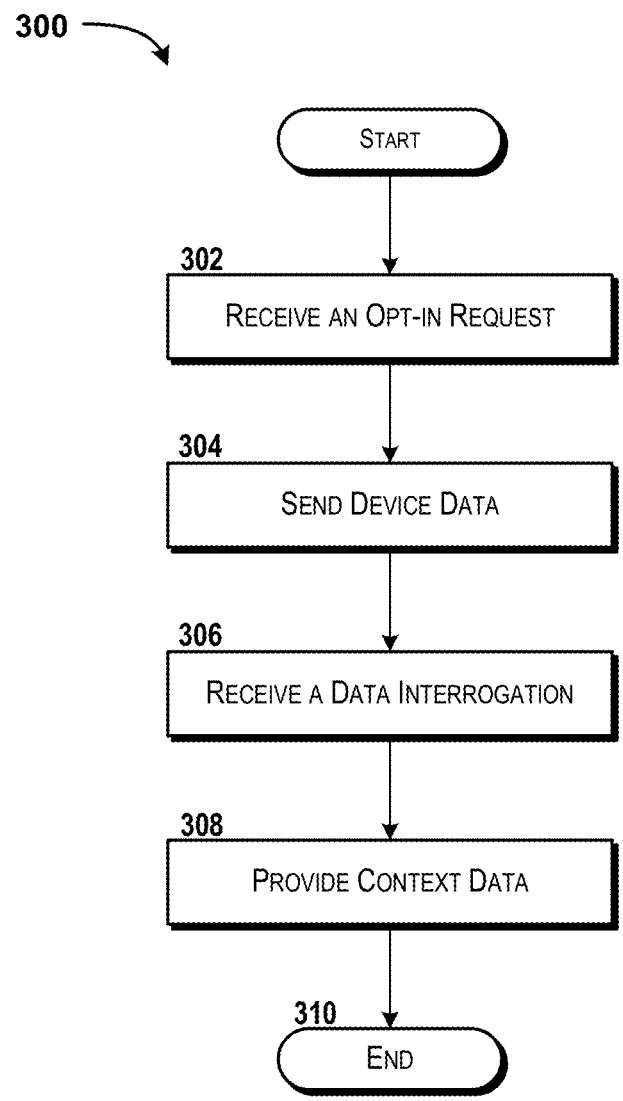
FIG. 3 is a flow diagram showing aspects of a method for providing an opt-in process to enable access to restricted data, according to another illustrative embodiment of the concepts and technologies described herein.

Turning now to FIG. 3, aspects of a method 300 for providing an opt-in process to enable access to restricted data will be described in detail, according to another illustrative embodiment. For purposes of illustrating and describing the concepts of the present disclosure, the method 300 is described herein as being performed by the user device 114 via execution of one or more software modules such as, for example, the application programs 118. It should be understood that additional and/or alternative devices and/or network nodes can provide the functionality described herein via execution of one or more modules, applications, and/or other software including, but not limited to, the application programs 118. Thus, the illustrated embodiments are illustrative, and should not be viewed as being limiting in any way.

The method 300 begins at operation 302. At operation 302, the user device 114 can receive an opt-in request. Based on the description of FIGS. 1-2 above, it can be appreciated that the opt-in request received or otherwise obtained in operation 302 can be received from a server computer 102 or other entities. The opt-in request 120 sent in operation 202 can be configured to inform the user device 114 (or a user or other entity associated with the user device 114) that restricted data 108 associated with the user device 114 can be used for commercial purposes if the user or other entity authorizes such use. The opt-in request 120 also can be configured to inform the user device 114 (or a user or other entity associated with the user device 114) that parameters governing use of the restricted data (e.g., geofences that define or identify locations in or at which the restricted data 108 associated with the user device 114 may be used for commercial purposes; times at which the restricted data 108 associated with the user device 114 may be used for commercial purposes; purposes for which the restricted data 108 associated with the user device 114 can be used for commercial purposes; or the like) can be defined.

As explained above with reference to FIGS. 1-2, the opt-in request 120 received or otherwise obtained in operation 302 can be provided to the user device 114 by other entities and/or without an explicit request. For example, the "request" illustrated in FIG. 3 as being "received" may not be "received" per se. Rather, a request, whether explicit or implicit, can be made or can occur during ordering of a service, purchasing of a device, activation of a service, and/or at other times. Thus, the illustrated embodiment is illustrative and should not be construed as being limiting in any way.

From operation 302, the method 300 can proceed to operation 304. At operation 304, the user device 114 can send device data 124 to the server computer 102. In some embodiments, the application programs 118 can be configured to package the device data 124 and to send the device data 124 to the server computer 102. In some embodiments, the application programs 118 can include a restricted data access application as a standalone application (or as a component, module, plugin, etc. of another application). Regardless of what application or functionality is used, the user device 114 can provide, in operation 304, the device data 124 to the server computer 102 in operation 304.

According to various embodiments, the user device 114 can obtain the data that is included in the device data 124 by presenting an opt-in UI 122 and obtaining data via the opt-in UI 122. In some other embodiments, the user device 114 can access configurations, settings, preferences, or the like. At any rate, the user device 114 can create the device data 124, which can include an opt-in decision. The opt-in decision can include an opt-out or an opt-in. If an opt-in is included, the device data 124 can further include location parameters, time parameters, and purpose parameters. The device data 124 also can include, in some embodiments, other parameters as illustrated and described herein.

From operation 304, the method 300 can proceed to operation 306. At operation 306, the user device 114 can receive a data interrogation such as the data interrogation 130 illustrated and described above with reference to FIG. 1. The data interrogation 130 can request contextual information from the user device 114 for use in analyzing (and increasing understanding of) the restricted data 108. In some embodiments, for example, the data interrogation 130 received in operation 306 may ask the user device 114 for information relating to resource (e.g., location services, data services, voice services, power, etc.) usage; activity information (e.g., that the user device 114 was last used for or is being used for, a most recent purchase, a search history, etc.); sensor information (e.g., ambient sound, ambient light, movement, etc.); and/or other information relating to a context in which the user device 114 is being used (or was recently used). The information requested by way of operation 306 can be used by the server computer 102 to interpret restricted data 108 and/or can itself include or be restricted data 108. Thus, operation 306 can correspond to requesting supplemental information that will be used by the server computer 102 to interpret the restricted data 108 and/or requesting the restricted data 108, in various embodiments.

From operation 306, the method 300 can proceed to operation 308. At operation 308, the user device 114 can provide the context data such as the context data 132. Thus, in operation 308, the user device 114 can identify the data requested by way of the data interrogation 130 received in operation 306, create data that responds to the data interrogation 130, and send the response to the data interrogation to the server computer 102 as the context data 132. In some embodiments, the user device 114 can execute a restricted data access application that can provide the functionality of operation 308. It can be appreciated that the restricted data access application (or other application or module) can be configured to consider settings, configurations, preferences, etc., (e.g., privacy settings) when identifying contextual information to share and/or when sending the context data 132. It should be understood that this example is illustrative, and therefore should not be construed as being limiting in any way.

From operation 308, the method 300 can proceed to operation 310. The method 300 can end at operation 310.

Figure 4:
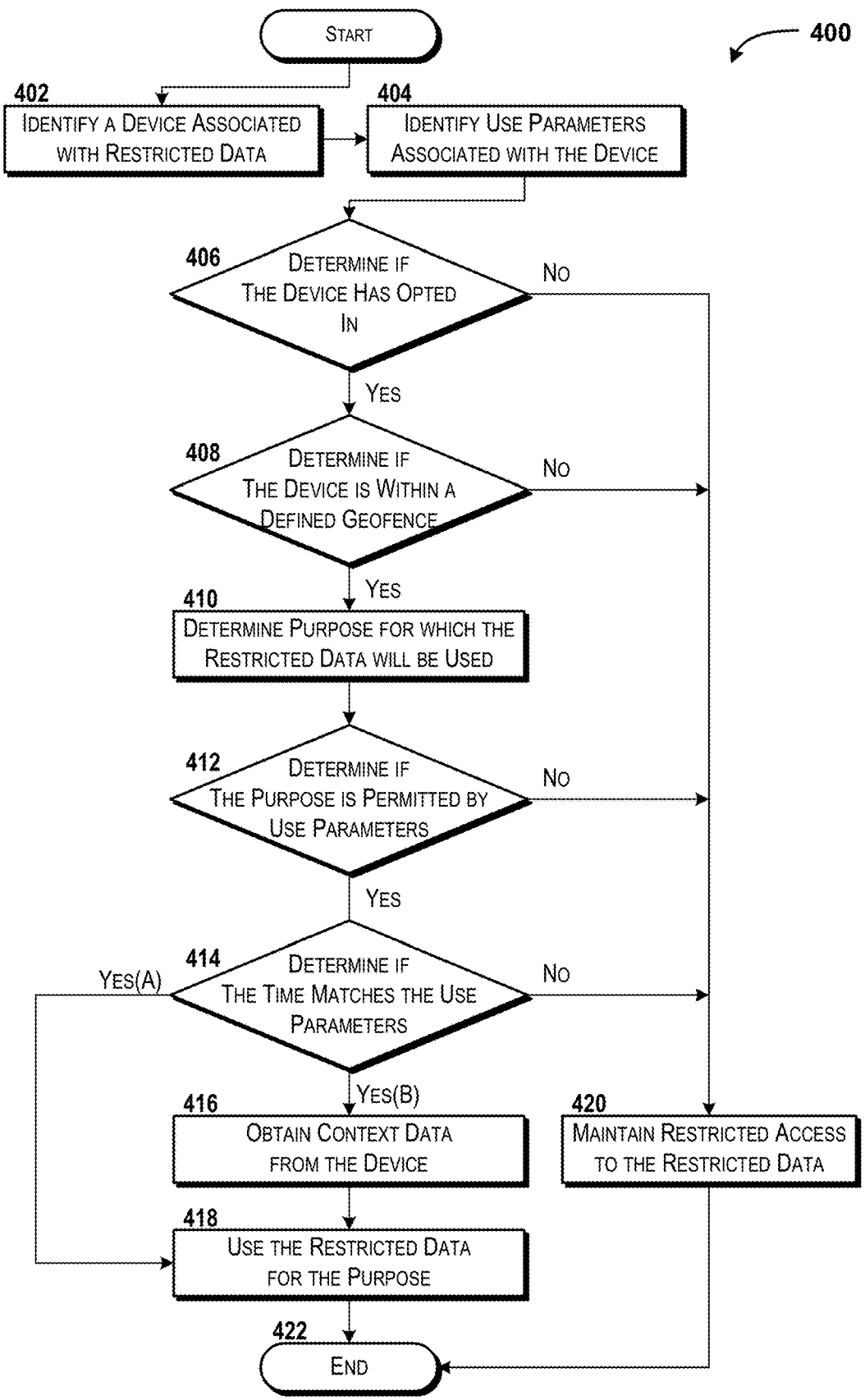
FIG. 4 is a flow diagram showing aspects of a method for accessing restricted data using geofences, according to an illustrative embodiment of the concepts and technologies described herein.

Turning now to FIG. 4, aspects of a method 400 for accessing restricted data using geofences will be described in detail, according to an illustrative embodiment. For purposes of illustrating and describing the concepts of the present disclosure, the method 400 is described herein as being performed by the server computer 102 via execution of one or more software modules such as, for example, the restricted data access service 106. It should be understood that additional and/or alternative devices and/or network nodes can provide the functionality described herein via execution of one or more modules, applications, and/or other software including, but not limited to, the restricted data access service 106. Thus, the illustrated embodiments are illustrative, and should not be viewed as being limiting in any way.

The method 400 begins at operation 402. At operation 402, the server computer 102 can identify a device associated with restricted data 108. According to various embodiments, the server computer 102 can identify the device associated with the restricted data 108 by identifying, via analysis of the restricted data 108, one or more devices associated with the restricted data 108 and identifying the device based on this analysis. In some other embodiments, the server computer 102 can receive a request from a particular device, user, or other entity, the request for enabling access to the restricted data 108; and the server computer 102 can identify the device based on this request. Regardless of how the device is identified in operation 402, the server computer 102 can identify a particular device associated with restricted data 108.

From operation 402, the method 400 can proceed to operation 404. At operation 404, the server computer 102 can identify use parameters 128 associated with the device identified in operation 402. As explained above, the use parameters 128 can include not only parameters, but also records that define, for a device identified by a device identifier, a geofence, time, and purpose for which restricted data 108 associated with that device may be used for commercial purposes. Thus, the use parameters 128 can include one or more records (e.g., tuples) that include at least 1) a device or user identifier; 2) a geofence (defined as either a location/threshold or boundaries); 3) a time; and 4) a purpose. The server computer 102 can query the use parameters 128 and obtain, from the data store 112, all records (use parameters 128) that pertain to the device identified in operation 402.

From operation 404, the method 400 can proceed to operation 406. At operation 406, the server computer 102 can determine if the device identified in operation 402 has opted-in to enabling access to the restricted data 108 for commercial purposes. According to various embodiments, the server computer 102 can analyze the use parameters 128 identified in operation 404 and determine, based on the analysis, whether or not any use parameters 128 is associated with the device identified in operation 402. It can be appreciated that in some embodiments, only use parameters associated with opting-in devices are stored, and as such the functionality of operations 404 and 406 can be combined in some embodiments (e.g., if use parameters 128 associated with a device are identified, the opt-in can be determined based solely on that). In some other embodiments, the use parameters 128 can include opt-out decisions, so operations 404 and 406 can both be executed by the server computer 102. Regardless, the server computer 102 can determine if the device identified in operation 402 has opted in.

If the server computer 102 determines, in operation 406 (or in a combined operation as explained above), that the device identified in operation 402 as opted-in to enabling access to the restricted data 108 for commercial purposes, the method 400 can proceed to operation 408. At operation 408, the server computer 102 can determine if the device identified in operation 402 is within a define geofence. In particular, the server computer 102 can determine if the device identified in operation 402 is within any geofence defined by any record of the use parameters 128 determined, identified, and/or obtained in operation 404. Thus, in operation 408, the server computer 102 can analyze the use parameters 128 and determine geofences that define locations at which use of the restricted data 108 is authorized. The server computer 102 also can determine (or receive data indicating a determination of) a current location of the device identified in operation 402 and determine whether the current location of the device identified in operation 402 matches any location defined by the use parameters 128. It should be understood that the server computer 102 can determine if the device identified in operation 402 is within a geofence associated with the use parameters 128 in additional and/or alternative manners, and as such, that this embodiment is illustrative and should not be construed as being limiting in any way.

If the server computer 102 determines, in operation 408, that the device identified in operation 402 is within a defined geofence (of one or more records of the use parameters 128), the method 400 can proceed to operation 410. At operation 410, the server computer 102 can determine one or more purposes for which the restricted data 108 will be used. According to various embodiments, the server computer 102 can determine a purpose for the restricted data 108 by identifying an initial request or operation associated with the access to the restricted data 108, by identifying a requestor associated with the request for access to the restricted data 108, etc. Because the purpose for which access to the restricted data 108 is requested can be determined in various manners, it should be understood that the above examples are illustrative and should not be construed as being limiting in any way.

From operation 410, the method 400 can proceed to operation 412. At operation 412, the server computer 102 can determine if the purpose determined in operation 410 is permitted by any of the use parameters that a) were determined in operation 404 and b) that also satisfy the geofences determined in operation 408. Thus, it can be appreciated that a first pool of use parameters 128 may be identified in operation 404, and that some of that pool of use parameters 128 may be eliminated in operation 408. Namely, of the pool of use parameters 128 identified in operation 404, only those use parameters 128 that include the geofence within which the device is determined to be located in operation 408 may be considered in remaining operations of the method 400.

In particular, the server computer 102 can analyze the use parameters 128 identified in operation 404 and determine, based on the analysis, if the purpose determined in operation 410 matches a purpose defined by any of the use parameters 128 that also satisfy the geofence identified in operation 408. It should be understood that this example is illustrative, and therefore should not be construed as being limiting in any way.

If the server computer 102 determines, in operation 412, that the purpose identified in operation 410 matches a purpose of one of the use parameters 128 a) identified in operation 404, and b) that satisfies the geofence identified in operation 408, the method 400 can proceed to operation 414. At operation 414, the server computer 102 can determine if a current time matches a time parameter of any of the use parameters 128 a) identified in 404, b) determined to satisfy the geofence determined in operation 408, and c) determined to match the purpose identified in operation 410.

If the server computer 102 determines, in operation 414, that a current time matches a time parameter of any of the use parameters 128 a) identified in 404, b) determined to satisfy the geofence determined in operation 408, and c) determined to match the purpose identified in operation 410, the method 400 can proceed to operation 416 or operation 418. In particular, in some cases, the method 400 can proceed to operation 416, wherein the server computer 102 can obtain context data 132 from the device identified in operation 402. As explained above, the server computer 102 can generate a data interrogation 130 and receive the context data 132 in response to the data interrogation 130, if desired. In some other instances, the obtaining of the context data 132 can be omitted, and as such, the method 400 can proceed from operation 414 to operation 418. The method 400 also can proceed to operation 418 from operation 416.

At operation 418, the server computer 102 can use the restricted data 108 (and/or the context data 132) for the purpose identified in operation 410. Returning to operation 406, if the server computer 102 determines that the device has not opted-in to enable access to the restricted data 108 for commercial purposes, the method 400 can proceed to operation 420. The method 400 also can proceed to operation 420 if the server computer 102 determines, in operation 408, that the device is not within a defined geofence associated with the use parameters 128 determined in operation 404. The method 400 also can proceed to operation 420 if the server computer 102 determines, in operation 412, that the purpose determined in operation 410 does not match a purpose associated with any of the use parameters 128 a) determined in operation 404, that b) match the geofence determined in operation 408. The method 400 also can proceed to operation 420 if the server computer 102 determines, in operation 414, that a current time does not match a time parameter associated with any of the use parameters 128 a) determined in operation 404, that b) match the geofence determined in operation 408, and c) match the purpose determined in operation 410.

At operation 420, the server computer 102 can maintain restricted access to the restricted data 108. Thus, the server computer 102 can disallow use of the restricted data 108 for purposes other than those allowed by law and regulation. From operation 420, the method 400 can proceed to operation 422. The method 400 also can proceed to operation 422 from operation 418. The method 400 can end at operation 422.

Figure 5A:
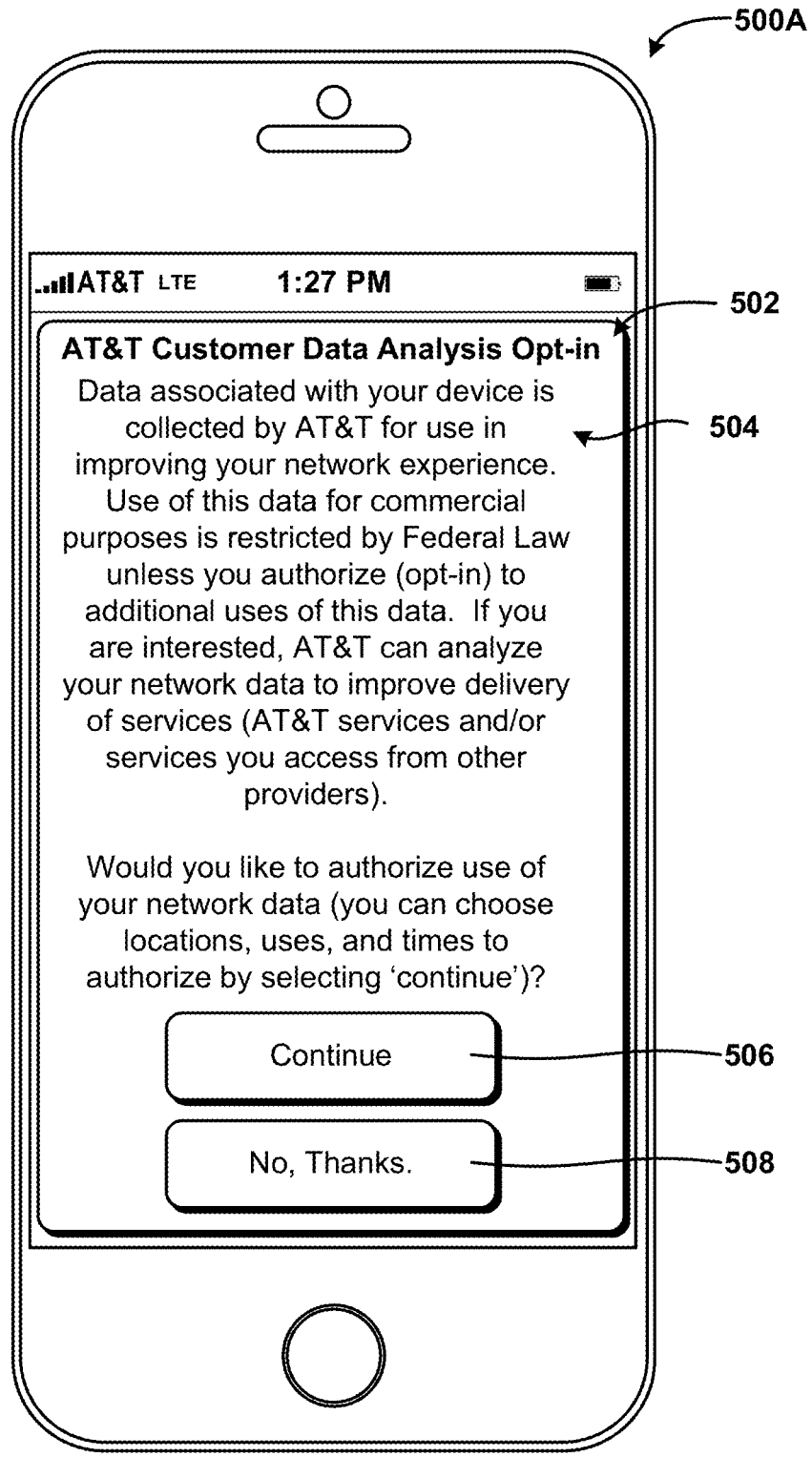
FIGS. 5A-5D are user interface diagrams showing various screen displays for enabling access to restricted data using geofences, according to some illustrative embodiments of the concepts and technologies described herein.

FIGS. 5A-5D are user interface ("UI") diagrams showing aspects of UIs for using and/or interacting with the restricted data access service 106 and/or the application programs 118, according to some illustrative embodiments. FIG. 5A shows an illustrative screen display 500A. According to some embodiments of the concepts and technologies described herein, the screen display 500A can be generated by a device such as the user device 114 via interactions with the restricted data access service 106 and/or the application programs 118. In particular, according to various embodiments, the user device 114 can generate the screen display 500A and/or other screen displays in conjunction with and/or based upon interactions with the application programs 118 described herein, which can be configured to render the screen display 500A using data generated at the user device 114 and/or using data provided by the restricted data access service 106. It should be appreciated that the UI diagram illustrated in FIG. 5A is illustrative of one contemplated example of the UIs that can be generated and/or displayed in accordance with the concepts and technologies disclosed herein, and therefore should not be construed as being limited in any way.

According to various embodiments, the screen display 500A can be presented, for example, when the restricted data access service 106 (or the server computer 102) sends an opt-in request 120 to the user device 114; when the user device 114 is requesting a service; when the user device 114 is requesting purchase of a device; and/or at other times as illustrated and described herein. Because the screen display 500A illustrated in FIG. 5A can be displayed at additional and/or alternative times, it should be understood that these examples are illustrative and therefore should not be construed as being limiting in any way.

The screen display 500A can include various menus and/or menu options (not shown in FIG. 5A). The screen display 500A also can include an opt-in decision prompt screen 502. The opt-in decision prompt screen 502 can be configured to inform the user (or other entity) that an opt-in is available to enable access to restricted data 108 for commercial uses. The opt-in decision prompt screen 502 can explain that the restricted data 108 cannot be used for commercial purposes and that the user (or other entity) can define purposes, times, and locations for which use of the restricted data 108 can be authorized.

Thus, as illustrated and described herein, the opt-in decision prompt screen 502 can include an opt-in explanation 504. The opt-in explanation 504 can provide context for the opt-in decision being requested by way of the opt-in decision prompt screen 502. It should be understood that this example is illustrative and therefore should not be construed as being limiting in any way.

Figure 5B:
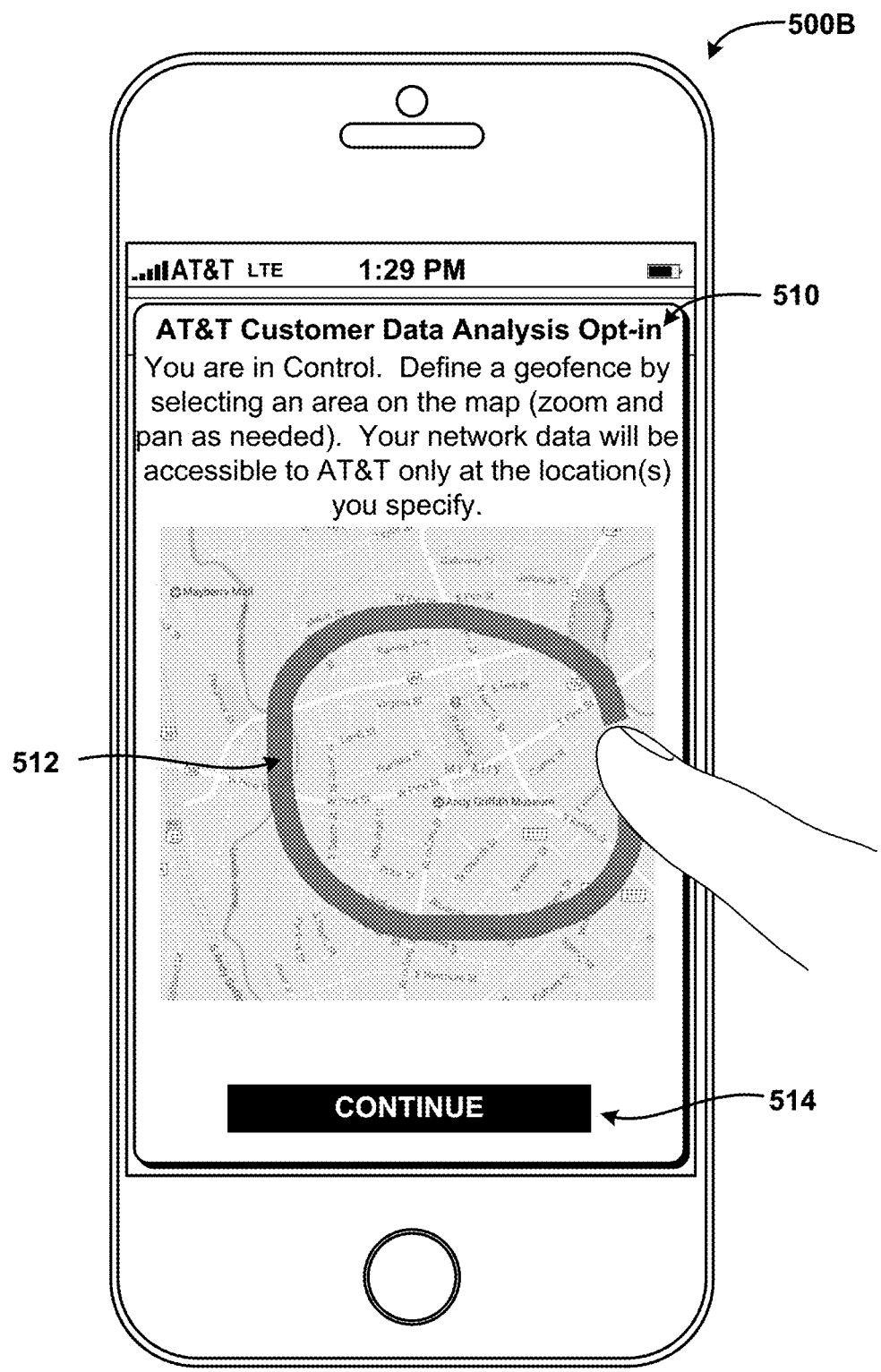
Figure 5C:
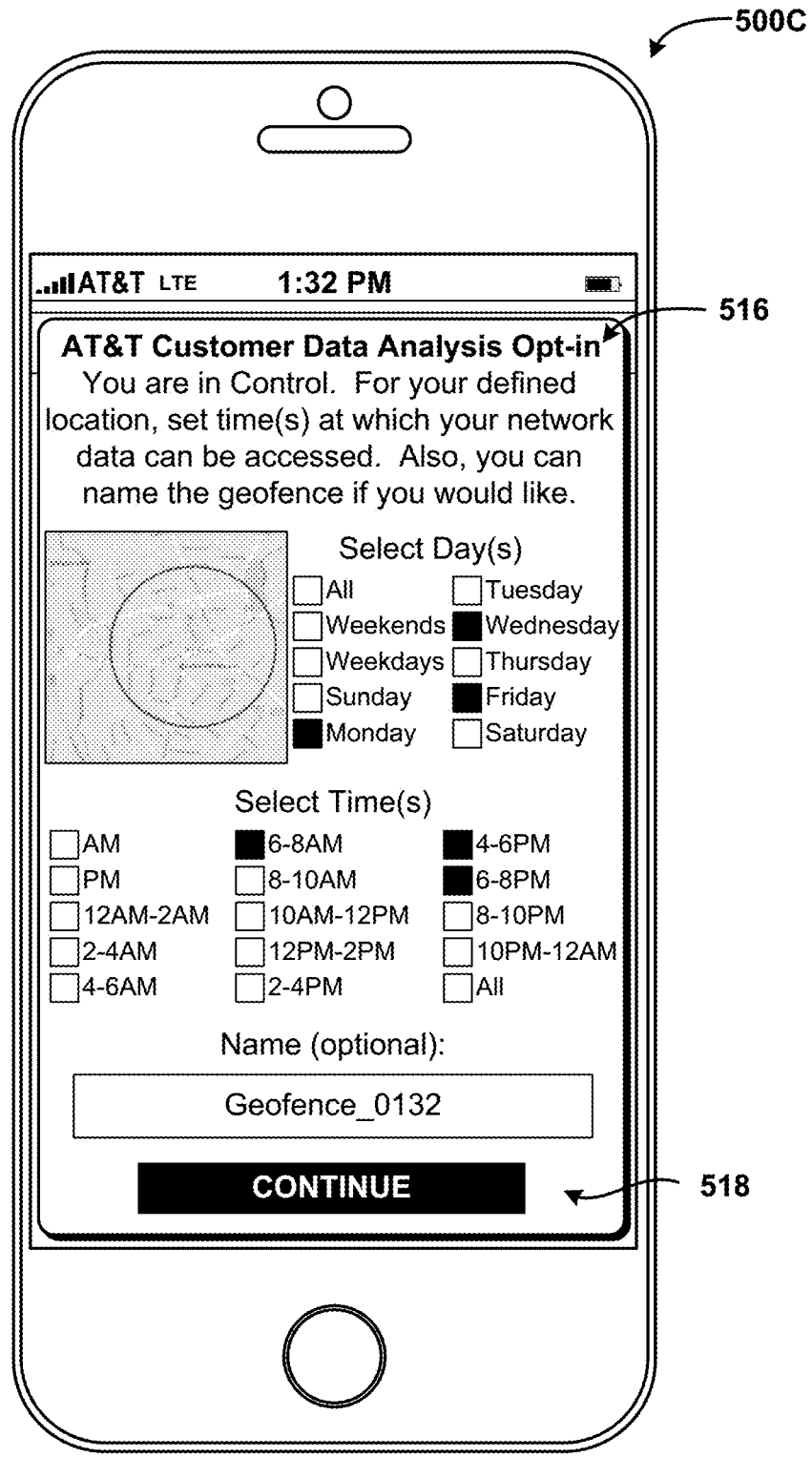
Figure 5D:
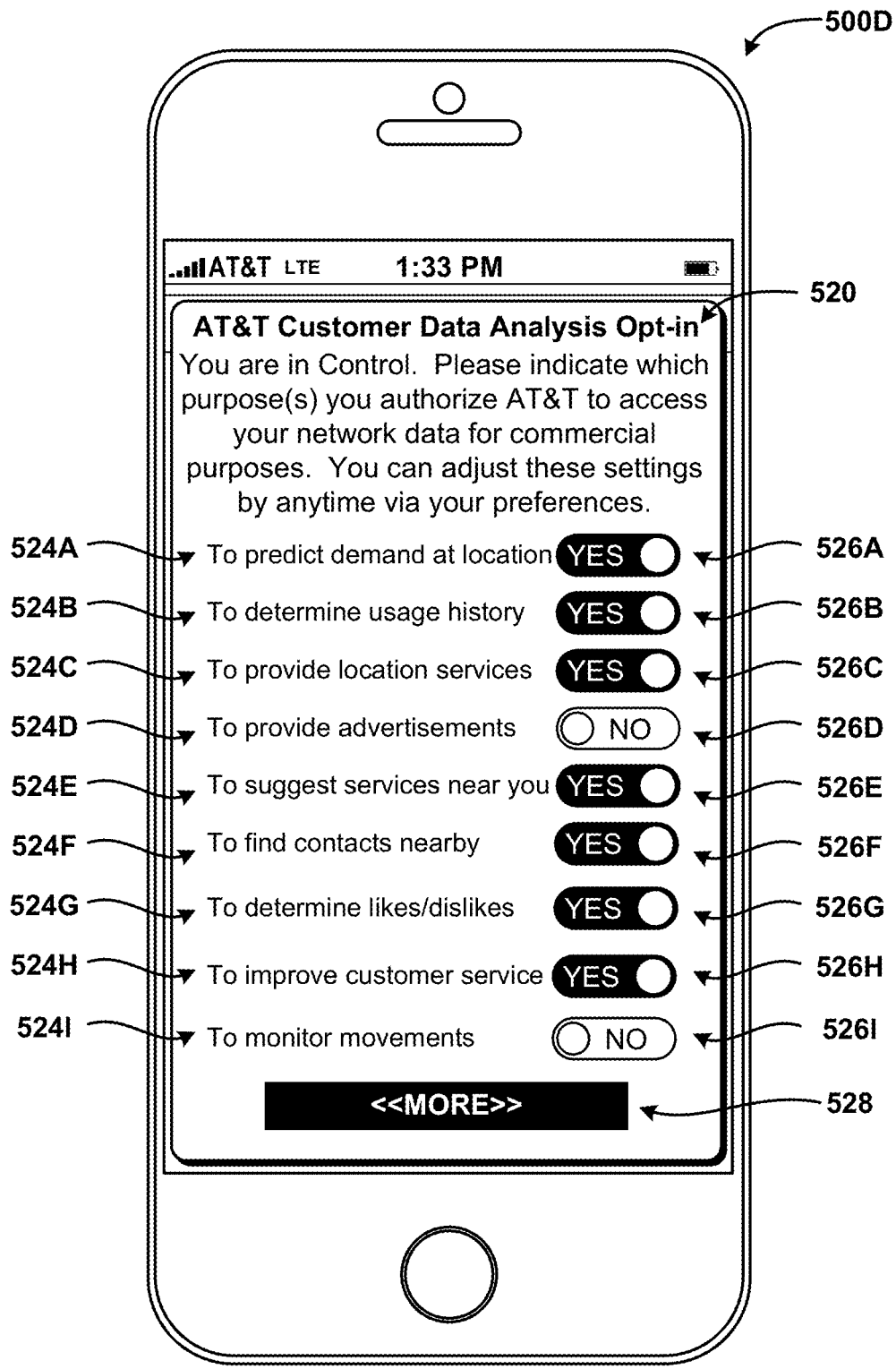

The opt-in decision prompt screen 502 also can include a UI control 506 that, if selected, causes the user device 114 to configure parameters associated with the opt-in decision. Thus, selection of the UI control 506 can cause the user device 114 to present additional and/or alternative displays for configuring parameters for enabling access to the restricted data 108, as illustrated and described herein and as shown in FIGS. 5B-5D. The opt-in decision prompt screen 502 also can include a UI control 508 to dismiss the opt-in decision prompt screen 502 and/or to opt-out. Thus, for example, the user or other entity can select the UI control 508 to cause the user device 114 to close the opt-in decision prompt screen 502 and/or to send an opt-out decision to a requesting entity (e.g., the server computer 102). Because additional or alternative controls can be included in the opt-in decision prompt screen 502, it should be understood that the example embodiment shown in FIG. 5A is illustrative and therefore should not be construed as being limiting in any way.

FIG. 5B shows an illustrative screen display 500B. According to some embodiments of the concepts and technologies described herein, the screen display 500B can be generated by a device such as the user device 114 via interactions with the restricted data access service 106 and/or the application programs 118. According to various embodiments, the screen display 500B can be presented, for example, in response to the user device 114 detecting selection of the UI control 506 illustrated and described above with reference to FIG. 5A. Because the screen display 500B illustrated in FIG. 5B can be displayed at additional and/or alternative times, it should be understood that these examples are illustrative and therefore should not be construed as being limiting in any way.

The screen display 500B can include various menus and/or menu options (not shown in FIG. 5B). The screen display 500B also can include a geofence definition display 510. The geofence definition display 510 can be configured to enable a user or other entity to define a geofence as illustrated and described herein. As explained above, a geofence as used herein can include a) a set of at least three coordinates that, when joined by imaginary lines, define boundaries for a geographic area, or b) a single set of coordinates (defining a latitude and a longitude) and a defined threshold and geometric shape about the set of coordinates (e.g., a set of coordinates (X, Y) and a circle centered on (X, Y) with radius of one hundred meters, etc.).

In the illustrated embodiment, the geofence definition display 510 can include a map display and a user or other entity can draw boundaries of the geofence on the map display. In the illustrated embodiment, a user has drawn the geofence, as indicated by a boundary indicator 512. It should be understood that this example is illustrative, and therefore should not be construed as being limiting in any way. In some embodiments, the exact shape of the geofence drawn via the geofence definition display 510 can be stored as the location parameters, while in some other embodiments, the user device 114 can be configured to normalize the boundaries drawn (e.g., the boundary indicator 512 may be replaced with a circle or other shape centered at the center of the boundary indicator 512, for example the embodiment shown in FIGS. 5B-5C). It should be understood that this example is illustrative and therefore should not be construed as being limiting in any way.

As shown in FIG. 5B, the geofence definition display 510 also can include a UI control 514. Selection of the UI control 514 can cause the user device 114 to present additional and/or alternative displays for obtaining time parameters, purpose parameters, and/or other parameters as illustrated and described herein. Thus, selection of the UI control 514 can cause the user device 114 to hide the screen display 500B and present other screen displays as illustrated and described herein. Because additional or alternative controls can be included in the geofence definition display 510, it should be understood that the example embodiment shown in FIG. 5B is illustrative and therefore should not be construed as being limiting in any way.

FIG. 5C shows an illustrative screen display 500C. According to some embodiments of the concepts and technologies described herein, the screen display 500C can be generated by a device such as the user device 114 via interactions with the restricted data access service 106 and/or the application programs 118. According to various embodiments, the screen display 500C can be presented, for example, in response to the user device 114 detecting selection of the UI control 514 illustrated and described above with reference to FIG. 5B. Because the screen display 500C illustrated in FIG. 5C can be displayed at additional and/or alternative times, it should be understood that these examples are illustrative and therefore should not be construed as being limiting in any way.

The screen display 500C can include various menus and/or menu options (not shown in FIG. 5C). The screen display 500C also can include a geofence time limits display 516. The geofence time limits display 516 can be configured to enable a user or other entity to define time parameters (e.g., time limits) for a particular geofence as illustrated and described herein. As explained above, the time parameters can define, for a particular geofence and/or purpose, one or more times at which restricted data 108 associated with the user device 114 can be used for commercial purposes. In the illustrated embodiment, the geofence time limits display 516 can include various days and time at which restricted data 108 associated with the user device 114 can be used for commercial purposes if, and only if, the geofence and purpose parameters are also satisfied. As shown in FIG. 5C, the associated geofence is displayed as a thumbnail image, and an optional text entry field is provided for naming the geofence. It should be understood that this example is illustrative, and therefore should not be construed as being limiting in any way. Also, the screen display 500C includes various definitions of time (e.g., days, time ranges, specific times, etc.). It can be appreciated that other definitions of time are possible and are contemplated. As such, it should be understood that this example is illustrative, and therefore should not be construed as being limiting in any way.

As shown in FIG. 5C, the geofence time limits display 516 also can include a UI control 518. Selection of the UI control 518 can cause the user device 114 to present additional and/or alternative displays for obtaining purpose parameters and/or other parameters as illustrated and described herein. Thus, selection of the UI control 518 can cause the user device 114 to hide the screen display 500C and present other screen displays as illustrated and described herein. Because additional or alternative controls can be included in the geofence time limits display 516, it should be understood that the example embodiment shown in FIG. 5C is illustrative and therefore should not be construed as being limiting in any way.

FIG. 5D shows an illustrative screen display 500D. According to some embodiments of the concepts and technologies described herein, the screen display 500D can be generated by a device such as the user device 114 via interactions with the restricted data access service 106 and/or the application programs 118. According to various embodiments, the screen display 500D can be presented, for example, in response to the user device 114 detecting selection of the UI control 518 illustrated and described above with reference to FIG. 5C. Because the screen display 500D illustrated in FIG. 5D can be displayed at additional and/or alternative times, it should be understood that these examples are illustrative and therefore should not be construed as being limiting in any way.

The screen display 500D can include various menus and/or menu options (not shown in FIG. 5D). The screen display 500D also can include a geofence purpose definition display 520. The geofence purpose definition display 520 can be configured to enable a user or other entity to define purpose parameters (e.g., purposes for which restricted data 108 associated with the user device 114 may be used) for a particular geofence and associated time limits as illustrated and described herein. As explained above, the purpose parameters can define, for a particular geofence and/or time limits, one or more purposes for which restricted data 108 associated with the user device 114 can be used for commercial purposes.

In the illustrated embodiment, the geofence purpose definition display 520 can include a number of purpose descriptions 524A-I (hereinafter collectively and/or generically referred to as "purpose descriptions 524"). Each of the purpose descriptions 524 can have a corresponding purpose selector 526A-I (hereinafter collectively and/or generically referred to as "purpose selectors 526") for selectively enabling or disabling use of the restricted data 108 for the purpose identified by the associated purpose description 524 in association with the geofence and time limits. Because other purpose descriptions 524 are contemplated, it should be understood that this example is illustrative, and therefore should not be construed as being limiting in any way.

A user or other entity can interact with the purpose selectors 526 to specify whether to enable or disable access to the restricted data 108 associated with the user device 114 for commercial purpose. In the illustrated embodiment, the purpose selector 526A can be used to enable or disable an option to allow the restricted data access service 106 to use restricted data 108 associated with the user device 114 for the commercial purpose of predicting a user's demand (of services or resources) at a location associated with the user device 114, where the demand is determined based on restricted data 108 associated with the user device 114. The purpose selector 526B can be used to enable or disable an option to allow the restricted data access service 106 to use restricted data 108 associated with the user device 114 for the commercial purpose of determining a usage history of the user associated with the user device 114, where the usage history is determined based on restricted data 108 associated with the user device 114. The purpose selector 526C can be used to enable or disable an option to allow the restricted data access service 106 to use restricted data 108 associated with the user device 114 for the commercial purpose of providing non-network based location services (e.g., to reduce the time to hail a cab, to provide stores or other venues of anticipated interest, etc.) at a location, where the non-network location services are provided based on the restricted data 108 associated with the user device 114.

The purpose selector 526D can be used to enable or disable an option to allow the restricted data access service 106 to use restricted data 108 associated with the user device 114 for the commercial purpose of providing an advertisement to the user device 114, where the advertisement is based on the restricted data 108 associated with the user device 114. The purpose selector 526E can be used to enable or disable an option to allow the restricted data access service 106 to use restricted data 108 associated with the user device 114 for the commercial purpose of suggesting a service to the user device 114, where the services that are to be suggested are determined based on restricted data 108 associated with the user device 114. The purpose selector 526F can be used to enable or disable an option to allow the restricted data access service 106 to use restricted data 108 associated with the user device 114 for the commercial purpose of finding contacts near the user device 114, where the available contacts are also determined based on restricted data 108 (associated with those contacts).

The purpose selector 526G can be used to enable or disable an option to allow the restricted data access service 106 to use restricted data 108 associated with the user device 114 for the commercial purpose of determining likes and dislikes of a user or other entity associated with the user device 114, where the likes and dislikes are determined based on restricted data 108 associated with the user device 114. The purpose selector 526H can be used to enable or disable an option to allow the restricted data access service 106 to use restricted data 108 associated with the user device 114 for the commercial purpose of improving customer service, where the improvements to customer services are based on restricted data 108 associated with the user device 114. The purpose selector 526I can be used to enable or disable an option to allow the restricted data access service 106 to use restricted data 108 associated with the user device 114 for the commercial purpose of monitoring movements of the user device 114, where the movements are determined based on restricted data 108 associated with the user device 114. Because additional and/or alternative purpose descriptions 524 and/or purpose selectors 526 can be included in the geofence purpose definition display 520, it should be understood that these examples are illustrative and therefore should not be construed as being limiting in any way.

As shown in FIG. 5D, the geofence purpose definition display 520 also can include a UI control 528. Selection of the UI control 528 can cause the user device 114 to present additional and/or alternative purposes for which the restricted data 108 associated with the user device 114 can be used during the defined time limits and defined geofence. Thus, selection of the UI control 528 can cause the user device 114 to present additional purpose descriptions 524 and purpose selectors 526. It should be understood that selection of the UI control 528 also can cause the user device 114 to hide the screen display 500D and present other screen displays as illustrated and described herein. Because additional or alternative controls (e.g., a control for finalizing the definition of the geofence and associated times and purposes) can be included in the geofence purpose definition display 520, it should be understood that the example embodiment shown in FIG. 5D is illustrative and therefore should not be construed as being limiting in any way.

Figure 6:
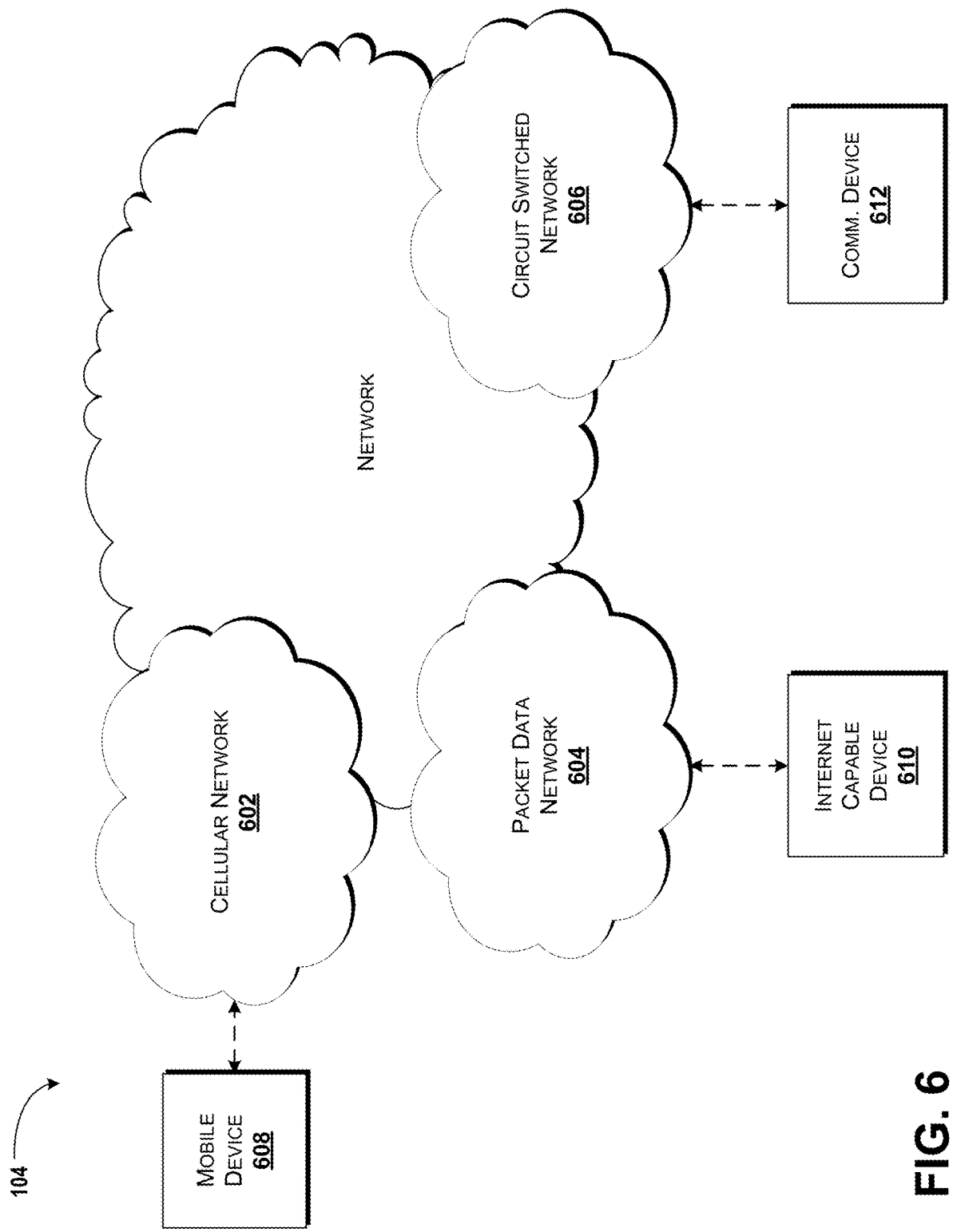
FIG. 6 schematically illustrates a network, according to an illustrative embodiment of the concepts and technologies described herein.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSDPA), and HSPA+. The cellular network 602 also is compatible with 4G mobile communications standards as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
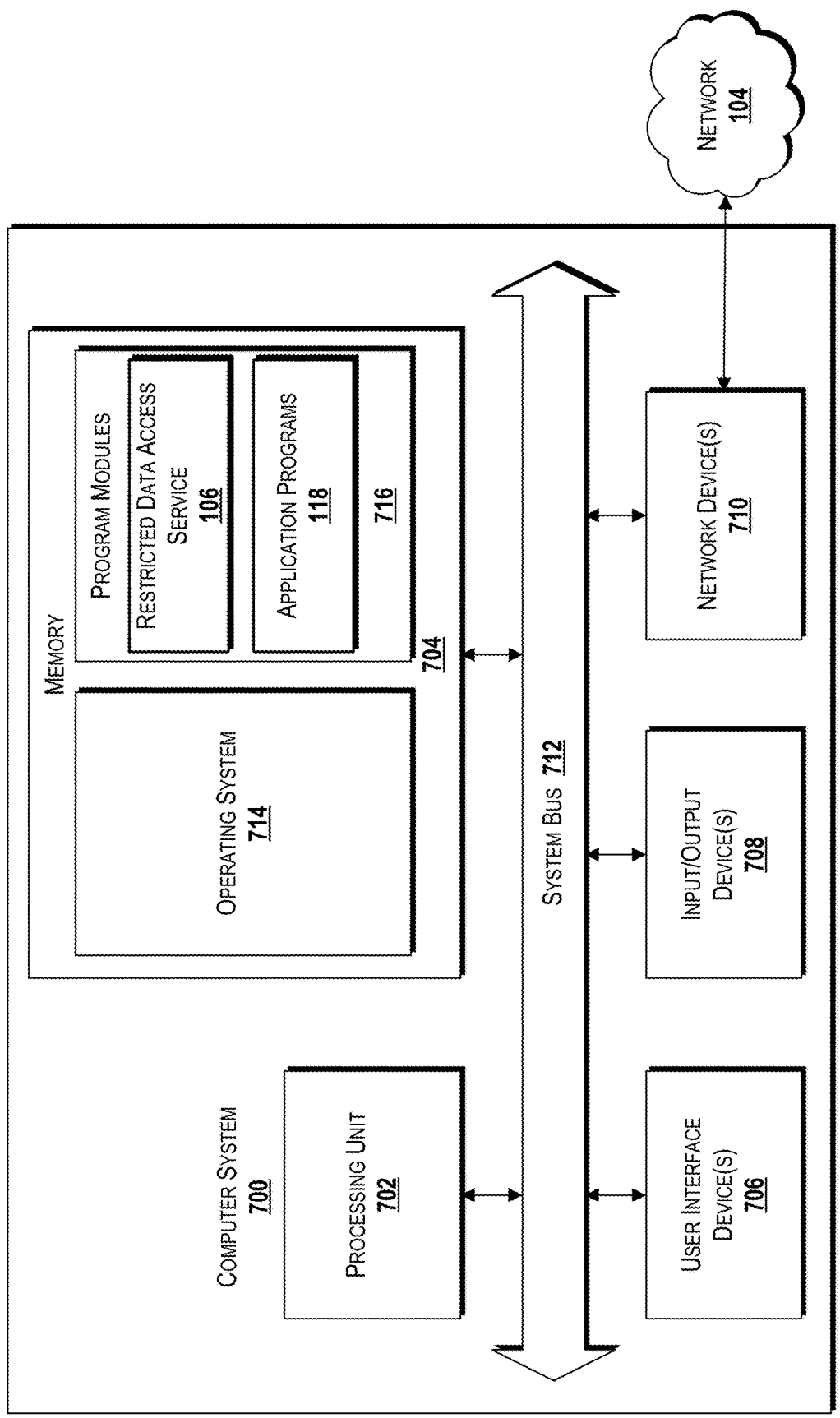
FIG. 7 is a block diagram illustrating an example computer system configured to enable access to restricted data using geofences, according to some illustrative embodiments of the concepts and technologies described herein.

FIG. 7 is a block diagram illustrating a computer system 700 configured to provide the functionality described herein for enabling access to restricted data using geofences, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 can include the restricted data access service 106, the application programs 118, and/or other applications or services. These and/or other programs can be embodied in computer-readable media containing instructions that, when executed by the processing unit 702, perform one or more of the methods 200, 300, and 400 described in detail above with respect to FIGS. 2-4 and/or other functionality as illustrated and described herein. It can be appreciated that, at least by virtue of the instructions embodying the methods 200, 300, 400, and/or other functionality illustrated and described herein being stored in the memory 704 and/or accessed and/or executed by the processing unit 702, the computer system 700 is a special-purpose computing system that can facilitate providing the functionality illustrated and described herein. According to embodiments, the program modules 716 may be embodied in hardware, software, firmware, or any combination thereof. Although not shown in FIG. 7, it should be understood that the memory 704 also can be configured to store the restricted data 108, the opt-in request 120, the opt-in UI 122, the device data 124, the use parameters 128, the data interrogation 130, the context data 132, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
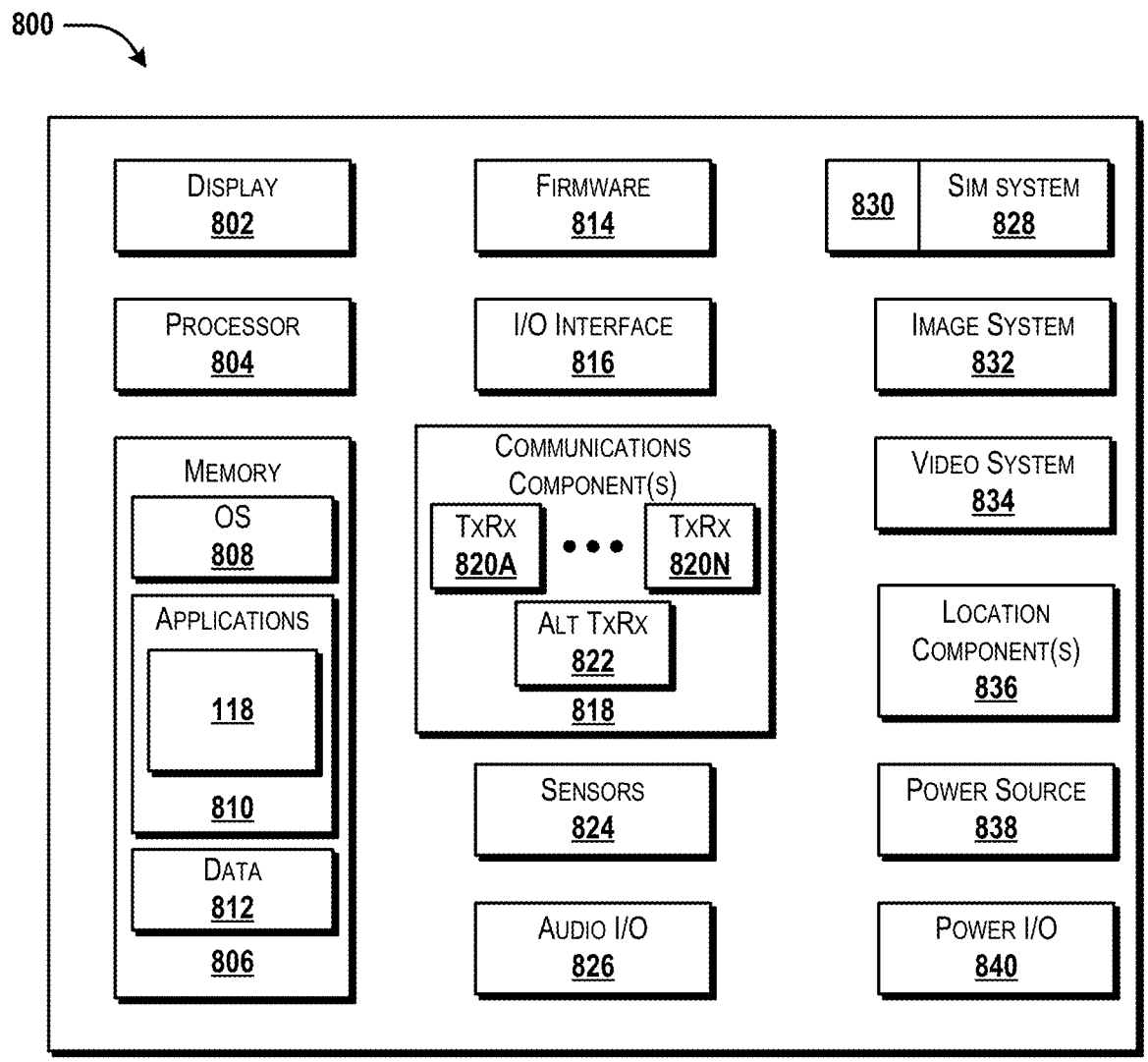
FIG. 8 is a block diagram illustrating an example mobile device configured to enable access to restricted data using geofences, according to some illustrative embodiments of the concepts and technologies described herein.

Turning now to FIG. 8, an illustrative mobile device 800 and components thereof will be described. In some embodiments, the user device 114 described above with reference to FIGS. 1-5D can be configured as and/or can have an architecture similar or identical to the mobile device 800 described herein in FIG. 8. It should be understood, however, that the user device 114 may or may not include the functionality described herein with reference to FIG. 8. While connections are not shown between the various components illustrated in FIG. 8, it should be understood that some, none, or all of the components illustrated in FIG. 8 can be configured to interact with one another to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements such as, for example, the opt-in UI 122, settings screens, preferences screens, various parameters, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 such as the application programs 118, the restricted data access application described above, other computer-executable instructions stored in a memory 806, or the like. In some embodiments, the applications 810 also can include a UI application (not illustrated in FIG. 8).

The UI application can interface with the operating system 808, such as the operating system 116 shown in FIG. 1, to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, to configure one or more parameters for enabling access to the restricted data 108, for configuring settings, for manipulating address book content and/or settings, to provide multimode interaction, for interacting with other applications 810, and otherwise facilitating user interaction with the operating system 808, the applications 810, and/or other types or instances of data 812 that can be stored at the mobile device 800. The data 812 can include, for example, the application programs 118, the restricted data access application, the restricted data access service 106, and/or other applications or program modules. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804.

It can be appreciated that, at least by virtue of storage of the instructions corresponding to the applications 810 and/or other instructions embodying other functionality illustrated and described herein in the memory 806, and/or by virtue of the instructions corresponding to the applications 810 and/or other instructions embodying other functionality illustrated and described herein being accessed and/or executed by the processor 804, the mobile device 800 is a special-purpose mobile device that can facilitate providing the functionality illustrated and described herein. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, the restricted data 108, the opt-in request 120, the opt-in UI 122, the device data 124, the use parameters 128, the data interrogation 130, the context data 132, user information, organization information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSDPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/ WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/ or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Based on the foregoing, it should be appreciated that systems and methods for enabling access to restricted data using geofences have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a processor; and
a memory that stores computer-executable instructions that, when executed by the processor, cause the processor to perform operations comprising
collecting network data from a network element, wherein law prohibits a network operator from using the network data for commercial purposes unless use of the network data for the commercial purposes is authorized by a user,
identifying a user device that is associated with the network data, wherein the user device is associated with the user,
identifying use parameters associated with the user device, wherein one of the use parameters comprises
a geofence that defines a location at which the user authorizes the use of the network data for a commercial purpose, and
time limits associated with the geofence, and
in response to detecting that the user device is at the location,
determining if the time limits associated with the geofence are satisfied,
determining a purpose for which the network data will be used, and
if a determination is made that the time limits are satisfied and that the purpose matches the commercial purpose of the one of the use parameters, using the network data for the purpose.

2. The system of claim 1, wherein the network data comprises operational information associated with a network operated by the network operator.

3. The system of claim 2, wherein the network data is accessible to the network operator.

4. The system of claim 1, wherein the computer-executable instructions, when executed by the processor, cause the processor to perform operations further comprising:
sending, to the user device, a request that specifies contextual information; and
receiving, from the user device, the contextual information requested, wherein the contextual information defines a process being completed by the user device.

5. The system of claim 1, wherein the computer-executable instructions, when executed by the processor, cause the processor to perform operations further comprising:
if a determination is made that the time limits are not satisfied, disallowing use of the network data for the purpose.

6. The system of claim 1, wherein the computer-executable instructions, when executed by the processor, cause the processor to perform operations further comprising:
if a determination is made that the purpose does not match any of the commercial purposes associated with any of the use parameters, disallowing use of the network data for the purpose.

7. The system of claim 1, wherein the computer-executable instructions, when executed by the processor, cause the processor to perform operations further comprising:
sending, to the user device, an opt-in request; and
receiving, in response to the opt-in request, device data that comprises an opt-in decision, the opt-in decision comprising location parameters, time parameters, and purpose parameters that define a plurality of commercial uses of the network data by the network operator, wherein the plurality of commercial uses of the network data by the network operator are authorized by the user, and wherein the use parameters are based on the device data.

8. A method comprising:
collecting, at a system comprising a processor, network data from a network element, wherein law prohibits a network operator from using the network data for commercial purposes unless use of the network data for the commercial purposes is authorized by a user;

identifying, by the processor, a user device that is associated with the network data, wherein the user device is associated with the user;
identifying, by the processor, use parameters associated with the user device, wherein one of the use parameters comprises
  a geofence that defines a location at which the user authorizes the use of the network data for a commercial purpose, and
  time limits associated with the geofence; and
in response to detecting that the user device is at the location,
  determining, by the processor, if the time limits associated with the geofence are satisfied,
  determining, by the processor, a purpose for which the network data will be used, and
  if a determination is made that the time limits are satisfied and that the purpose matches the commercial purpose of the one of the use parameters, allowing, by the processor, use of the network data for the purpose.

9. The method of claim 8, wherein the network data comprises operational information associated with a network operated by the network operator.

10. The method of claim 9, wherein the network data is accessible to the network operator.

11. The method of claim 8, further comprising:
sending, to the user device, a request that specifies contextual information; and
receiving, from the user device, the contextual information requested, wherein the contextual information defines a process being completed by the user device.

12. The method of claim 8, further comprising:
if a determination is made that the time limits are not satisfied, disallowing use of the network data for the purpose.

13. The method of claim 8, further comprising:
if a determination is made that the purpose does not match any of the commercial purposes associated with any of the use parameters, disallowing use of the network data for the purpose.

14. The method of claim 8, further comprising generating the use parameters, wherein generating the use parameters comprises:
sending, to the user device, an opt-in request; and
receiving, in response to the opt-in request, device data that comprises an opt-in decision, the opt-in decision comprising location parameters, time parameters, and purpose parameters that define a plurality of commercial uses of the network data by the network operator, wherein the plurality of commercial uses of the network data by the network operator are authorized by the user, and wherein the use parameters are based on the device data.

15. A computer storage medium having computer-executable instructions stored thereon that, when executed by a processor, cause the processor to perform operations comprising:
collecting network data from a network element, wherein law prohibits a network operator from using the network data for commercial purposes unless use of the network data for the commercial purposes is authorized by a user;
identifying a user device that is associated with the network data, wherein the user device is associated with the user;
identifying use parameters associated with the user device, wherein one of the use parameters comprises
  a geofence that defines a location at which the user authorizes the use of the network data for a commercial purpose, and
  time limits associated with the geofence; and
in response to detecting that the user device is at the location,
  determining if the time limits associated with the geofence are satisfied,
  determining a purpose for which the network data will be used, and
  if a determination is made that the time limits are satisfied and that the purpose matches the commercial purpose of the one of the use parameters, using the network data for the purpose.

16. The computer storage medium of claim 15, wherein the network data comprises operational information associated with a network operated by the network operator, and wherein the network data is accessible to the network operator.

17. The computer storage medium of claim 15, wherein the computer-executable instructions, when executed by the processor, cause the processor to perform operations further comprising:
sending, to the user device, a request that specifies contextual information; and
receiving, from the user device, the contextual information requested, wherein the contextual information defines a process being completed by the user device.

18. The computer storage medium of claim 15, wherein the computer-executable instructions, when executed by the processor, cause the processor to perform operations further comprising generating the use parameters, wherein generating the use parameters comprises:
if a determination is made that the time limits are not satisfied, disallowing use of the network data for the purpose.

19. The computer storage medium of claim 15, wherein the computer-executable instructions, when executed by the processor, cause the processor to perform operations further comprising:
if a determination is made that the purpose does not match any of the commercial purposes associated with any of the use parameters, disallowing use of the network data for the purpose.

20. The computer storage medium of claim 15, wherein the computer-executable instructions, when executed by the processor, cause the processor to perform operations further comprising:
sending, to the user device, an opt-in request; and
receiving, in response to the opt-in request, device data that comprises an opt-in decision, the opt-in decision comprising location parameters, time parameters, and purpose parameters that define a plurality of commercial uses of the network data by the network operator, wherein the plurality of commercial uses of the network data by the network operator are authorized by the user, and wherein the use parameters are based on the device data.

* * * * *